(12) United States Patent
Tsai et al.

(10) Patent No.: US 12,429,633 B2
(45) Date of Patent: *Sep. 30, 2025

(54) IMAGING LENS ASSEMBLY, CAMERA MODULE AND ELECTRONIC DEVICE

(71) Applicant: LARGAN PRECISION CO., LTD., Taichung (TW)

(72) Inventors: Wen-Yu Tsai, Taichung (TW); Heng-Yi Su, Taichung (TW); Ming-Ta Chou, Taichung (TW); Chien-Pang Chang, Taichung (TW); Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 51 days.

This patent is subject to a terminal disclaimer.

(21) Appl. No.: 18/507,179

(22) Filed: Nov. 13, 2023

(65) Prior Publication Data

US 2024/0077657 A1 Mar. 7, 2024

Related U.S. Application Data

(63) Continuation of application No. 16/935,378, filed on Jul. 22, 2020, now Pat. No. 11,852,848.
(Continued)

(51) Int. Cl.
*G02B 1/10* (2015.01)
*G02B 5/00* (2006.01)
*G02B 13/18* (2006.01)

(52) U.S. Cl.
CPC ............. *G02B 5/003* (2013.01); *G02B 13/18* (2013.01); *G02B 2207/101* (2013.01); *G02B 2207/107* (2013.01)

(58) Field of Classification Search
CPC .. G02B 5/003; G02B 13/18; G02B 2207/101; G02B 2207/107; G02B 7/02;
(Continued)

(56) References Cited

U.S. PATENT DOCUMENTS 6,104,534 A 8/2000 Ohta et al.
6,175,450 B1 1/2001 Andreani et al.
(Continued)

FOREIGN PATENT DOCUMENTS

CN 101520520 A 9/2009
CN 102162866 A 8/2011
(Continued)

*Primary Examiner* — Balram T Parbadia
(74) *Attorney, Agent, or Firm* — McClure, Qualey & Rodack, LLP

(57) ABSTRACT

An imaging lens assembly includes a first optical element and a low-reflection layer. The first optical element has a central opening, and includes a first surface, a second surface and a first outer diameter surface. The first outer diameter surface is connected to the first surface and the second surface. The low-reflection layer is located on at least one of the first surface and the second surface, and includes a carbon black layer, a nano-microstructure and a coating layer. The nano-microstructure is directly contacted with and connected to the carbon black layer, and the nano-microstructure is farther from the first optical element than the carbon black layer from the first optical element. The coating layer is directly contacted with and connected to the nano-microstructure, and the coating layer is farther from the first optical element than the nano-microstructure from the first optical element.

39 Claims, 23 Drawing Sheets

Related U.S. Application Data

(60) Provisional application No. 62/941,937, filed on Nov. 29, 2019.

(58) Field of Classification Search
CPC ........ G02B 13/001; G02B 1/10; G02B 5/005; G02B 1/113; G02B 1/115; G02B 5/00; G02B 13/00

See application file for complete search history.

(56) References Cited

U.S. PATENT DOCUMENTS

| | | |
|---|---|---|
| 6,493,144 B2 | 12/2002 | Tanaka et al. |
| 7,787,184 B2 | 8/2010 | Yoshikawa et al. |
| 8,125,714 B2 | 2/2012 | Yamada et al. |
| 8,248,699 B2 | 8/2012 | Terayama |
| 8,481,148 B2 | 7/2013 | Adachi et al. |
| 8,520,301 B2 | 8/2013 | Lin et al. |
| 8,840,257 B2 | 9/2014 | Kawagishi et al. |
| 8,958,155 B2 | 2/2015 | Kubota |
| 9,022,585 B2 | 5/2015 | Ogo et al. |
| 9,069,125 B2 | 6/2015 | Hirasawa et al. |
| 9,413,937 B2 | 8/2016 | Lin |
| 9,678,336 B2 | 6/2017 | Cho |
| 9,709,704 B2 | 7/2017 | Miyahara et al. |
| 9,753,243 B2 | 9/2017 | Chou |
| 9,904,050 B2 | 2/2018 | Lin |
| 11,852,848 B2 * | 12/2023 | Tsai .......................... G02B 1/10 |
| 2011/0058242 A1 * | 3/2011 | Saito ...................... G02B 26/02 |
| | | 359/227 |
| 2012/0243099 A1 | 9/2012 | Kaneko |
| 2013/0286282 A1 | 10/2013 | Yamamoto |
| 2014/0078589 A1 | 3/2014 | Fujii |
| 2015/0177419 A1 | 6/2015 | Chu |
| 2015/0253532 A1 | 9/2015 | Lin |
| 2015/0378058 A1 | 12/2015 | Sonoda |
| 2017/0139175 A1 | 5/2017 | Wei |
| 2017/0139176 A1 | 5/2017 | Wei |
| 2018/0138351 A1 * | 5/2018 | Hsu .......................... C09D 1/00 |
| 2018/0270404 A1 | 9/2018 | Ishida |
| 2019/0049689 A1 | 2/2019 | Lin et al. |
| 2020/0132986 A1 | 4/2020 | Lai et al. |
| 2020/0346421 A1 | 11/2020 | Amemiya |

FOREIGN PATENT DOCUMENTS

| | | |
|---|---|---|
| CN | 103048705 A | 4/2013 |
| CN | 103443663 A | 12/2013 |
| CN | 104081229 A | 10/2014 |
| TW | I676852 B | 11/2019 |
| WO | 2019087439 A1 | 8/2020 |

* cited by examiner

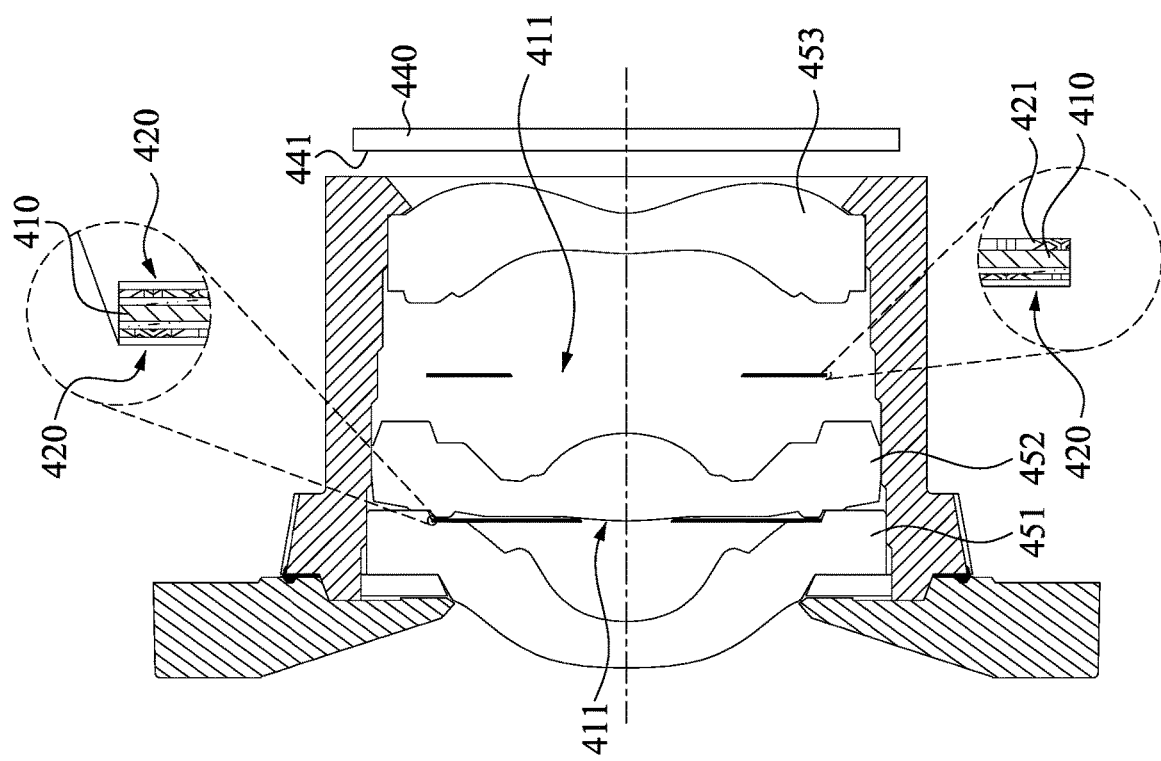

IMAGING LENS ASSEMBLY, CAMERA MODULE AND ELECTRONIC DEVICE

RELATED APPLICATIONS

The present application is a continuation of the application Ser. No. 16/935,378, filed Jul. 22, 2020, now U.S. Pat. No. 11,852,848, issued on Dec. 26, 2023, which claims priority to U.S. Provisional Application Ser. No. 62/941,937, filed Nov. 29, 2019, which is herein incorporated by reference.

BACKGROUND

Technical Field

The present disclosure relates to an imaging lens assembly and a camera module. More particularly, the present disclosure relates to an imaging lens assembly and a camera module applicable to portable electronic devices.

Description of Related Art

In recent years, portable electronic devices have developed rapidly. For example, intelligent electronic devices and tablets have been filled in the lives of modern people, and camera modules mounted on portable electronic devices and imaging lens assemblies thereof have also prospered. However, as technology advances, the quality requirements of imaging lens assemblies are becoming higher and higher. Therefore, an imaging lens assembly, which the stray light can be reduced and the image quality can be enhanced, needs to be developed.

SUMMARY

According to one aspect of the present disclosure, an imaging lens assembly includes a first optical element and a low-reflection layer. The first optical element has a central opening, and includes a first surface, a second surface and a first outer diameter surface. The first surface faces towards one side of an object side and an image side of the imaging lens assembly and surrounds the central opening. The second surface faces towards the other side of the object side and the image side of the imaging lens assembly and surrounds the central opening. The first outer diameter surface is connected to the first surface and the second surface. The low-reflection layer is located on at least one of the first surface and the second surface, and includes a carbon black layer, a nano-microstructure and a coating layer. An appearance of the carbon black layer is black, and the carbon black layer is directly contacted with and connected to the at least one of the first surface and the second surface. The nano-microstructure is a porous structure form. The nano-microstructure is directly contacted with and connected to the carbon black layer, and the nano-microstructure is farther from the first optical element than the carbon black layer from the first optical element. The coating layer is directly contacted with and connected to the nano-microstructure, and the coating layer is farther from the first optical element than the nano-microstructure from the first optical element. When a reflectivity of the low-reflection layer at a wavelength of 400 nm is R40, a reflectivity of the low-reflection layer at a wavelength of 800 nm is R80, and a reflectivity of the low-reflection layer at a wavelength of 1000 nm is R100, the following conditions are satisfied: $R40 \leq 0.40\%$; $R80 \leq 0.40\%$; and $R100 \leq 0.40\%$.

According to one aspect of the present disclosure, a camera module includes the imaging lens assembly of the aforementioned aspect.

According to one aspect of the present disclosure, an electronic device includes the camera module of the aforementioned aspect and an image sensor. The image sensor is disposed on an image surface of the camera module.

BRIEF DESCRIPTION OF THE DRAWINGS

FIG. 4B is another schematic view of the electronic device according to the 4th example in FIG. 4A.

DETAILED DESCRIPTION

Figure 1A:
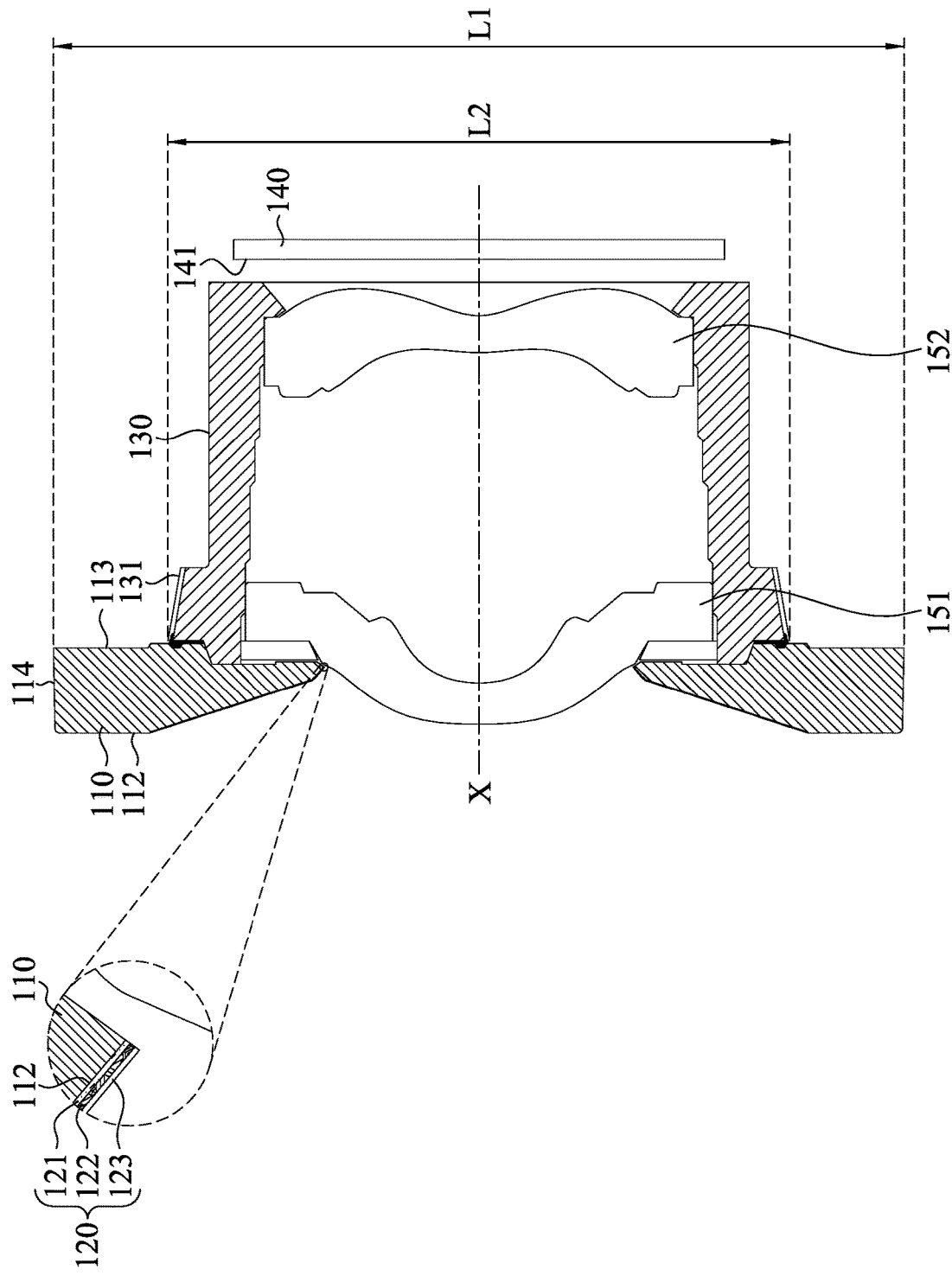
FIG. 1A is a schematic view of an electronic device according to the 1st example of the present disclosure.

The present disclosure provides an imaging lens assembly. The imaging lens assembly includes a first optical element and a low-reflection layer. The first optical element has a central opening, and includes a first surface, a second surface and a first outer diameter surface. The first surface faces towards one side of an object side and an image side of the imaging lens assembly and surrounds the central opening. The second surface faces towards the other side of the object side and the image side of the imaging lens assembly and surrounds the central opening. The first outer diameter surface is connected to the first surface and the second surface. The low-reflection layer is located on at least one of the first surface and the second surface, and includes a carbon black layer, a nano-microstructure and a coating layer. An appearance of the carbon black layer is black, and the carbon black layer is directly contacted with and connected to the at least one of the first surface and the second surface. The nano-microstructure is a porous structure form, and the nano-microstructure is directly contacted with and connected to the carbon black layer. The nano-microstructure is farther from the first optical element than the carbon black layer from the first optical element. The coating layer is directly contacted with and connected to the nano-microstructure, and the coating layer is farther from the first optical element than the nano-microstructure from the first optical element. When a reflectivity of the low-reflection layer at a wavelength of 400 nm is R40, a reflectivity of the low-reflection layer at a wavelength of 800 nm is R80, and a reflectivity of the low-reflection layer at a wavelength of 1000 nm is R100, the following conditions are satisfied: R40≤0.40%; R80≤0.40%; and R100≤0.40%.

Furthermore, the first optical element can be a plastic product such as a lens barrel, a spacer, a retainer, a light blocking element or a light blocking sheet, and so on, but is not limited thereto. Further, a gap does not exist between the first surface and a surface of the first optical element and between the second surface and the surface of the first optical element.

The low-reflection layer can be in a full-circle form or a layered structure, wherein the nano-microstructure of the low-reflection layer can be for absorbing the non-imaging stray light. Moreover, the carbon black layer is disposed on the at least one of the first surface and the second surface of the first optical element via a spray process, and the nano-microstructure is formed by the carbon black layer treated via a special treatment. Hence, a composition of the nano-microstructure is the same as a composition of the carbon black layer. In particular, the special treatment can be a surface roughening process of the carbon black layer, and then the nuclear reaction is performed on a surface of the carbon black layer with a proper material, such as the physical vapor deposition, the chemical vapor deposition, the vacuum evaporation, the sputtering, the ion plating, and so on. A surface structure with a nano-crystallization is formed via the crystallization process, and the surface structure of the nano-crystallization is the nano-microstructure. After forming the nano-microstructure, the coating layer is disposed on an external of the nano-microstructure to protect a nanostructure thereof. Therefore, it is favorable for strengthening the durability and the structural stability of the low-reflection layer. The carbon black layer is directly contacted with and connected to the nano-microstructure, and the nano-microstructure is directly contacted with and connected to the coating layer. Also, the gap does not exist between the carbon black layer and the nano-microstructure and between the nano-microstructure and the coating layer.

In detail, a reflection intensity of the stray light is weakened by the extremely low reflectivity of the low-reflection layer to further enhance the image quality. Further, different from techniques of prior art such as the inking process, the blasting process and the coating process, the insufficiency of the structural support of the low-reflection layer is improved by the low-reflection layer. The coating layer can be a single-layer film. Although the better anti-reflection effect can be obtained via a multi-layer film of prior art, a process of prior art is more complicated and high-cost, and the aforementioned problem can be improved by the present disclosure. By a choice of a material of the coating layer, surface characteristics of the low-reflection layer can be further changed, for example, the anti-oxidation ability can be enhanced; the light intensity of the light reflecting from a surface can be decreased, and so on.

When a reflectivity of the low-reflection layer at a wavelength of 380 nm is R38, the following condition can be satisfied: R38≤0.40%. Therefore, it is favorable for enhancing the image quality. Further, the following condition can be satisfied: R38≤0.30%. Further, the following condition can be satisfied: R38≤0.20%.

When a grain pitch of the nano-microstructure is GP, the following condition can be satisfied: 5 nm≤GP≤200 nm. In particular, the grain pitch of the nano-microstructure is a minimum distance between peaks of each of grains. Therefore, it is favorable for ensuring the grain pitch smaller than the wavelength of the visible light. Further, the following condition can be satisfied: 10 nm≤GP≤130 nm. Further, the following condition can be satisfied: 22 nm≤GP≤95 nm.

When a reflectivity of the low-reflection layer at a wavelength of 680 nm is R68, the following condition can be satisfied: R68≤0.40%. Therefore, it is favorable for decreasing the problem of the reddish coating and enhancing the image quality. Further, the following condition can be satisfied: R68≤0.30%. Further, the following condition can be satisfied: R68≤0.20%.

When the reflectivity of the low-reflection layer at the wavelength of 400 nm is R40, the reflectivity of the low-reflection layer at the wavelength of 800 nm is R80, and the reflectivity of the low-reflection layer at the wavelength of 1000 nm is R100, the following conditions can be satisfied: R40≤0.30%; R80≤0.30%; and R100≤0.30%. Further, the following conditions can be satisfied: R40≤0.20%; R80≤0.20%; and R100≤0.20%.

The imaging lens assembly can further include a second optical element. The second optical element includes a second outer diameter surface, and a maximum diameter of the second outer diameter surface is smaller than a diameter of the first outer diameter surface of the first optical element, the second optical element and the first optical element are assembled to each other along a direction parallel to an optical axis, and the first optical element faces towards the second optical element. Therefore, a surface of the first optical element can have a larger area of the low-reflection layer to eliminate the stray light from the external of the imaging lens assembly. Also, it is favorable for decreasing the background noise of the imaging to enhance the imaging sharpness.

The coating layer can be made of a silicon oxide ($SiO_2$). When the coating layer is made of the silicon oxide, it is favorable for enhancing the anti-oxidation ability of the low-reflection layer, and a refractive index of the silicon oxide is 1.46. Therefore, it is favorable for preventing the oxidation of the nano-microstructure and the oxidation of the carbon black layer to promote the durability of the low-reflection layer.

The coating layer can be made of a metal oxide. Therefore, a surface hardness and an abrasion resistance of the low-reflection layer can be further enhanced.

The coating layer can be made of a titanic oxide ($TiO_2$). The titanic oxide is a high refractivity material to lower the light intensity of the light reflecting from the surface of the low-reflection layer, and a refractive index of the titanic oxide is 2.24-2.37. Moreover, the coating layer can be made of an aluminum oxide ($Al_2O_3$), a metal nitride, a metal fluoride, and so on, and a refractive index of the aluminum oxide is 1.56. By a characteristic of the refractive index of different materials of the coating layer, a graded index can be obtained between the low-reflection layer and an air to lower the light intensity of the light reflecting from the surface of the low-reflection layer.

Each of the aforementioned features of the imaging lens assembly can be utilized in various combinations for achieving the corresponding effects.

The present disclosure provides a camera module, which includes the aforementioned imaging lens assembly.

The present disclosure provides an electronic device, which includes the aforementioned camera module and an image sensor. The image sensor is disposed on an image surface of the camera module.

According to the aforementioned embodiment, specific examples are provided, and illustrated via figures.

1ST EXAMPLE

Figure 1B:
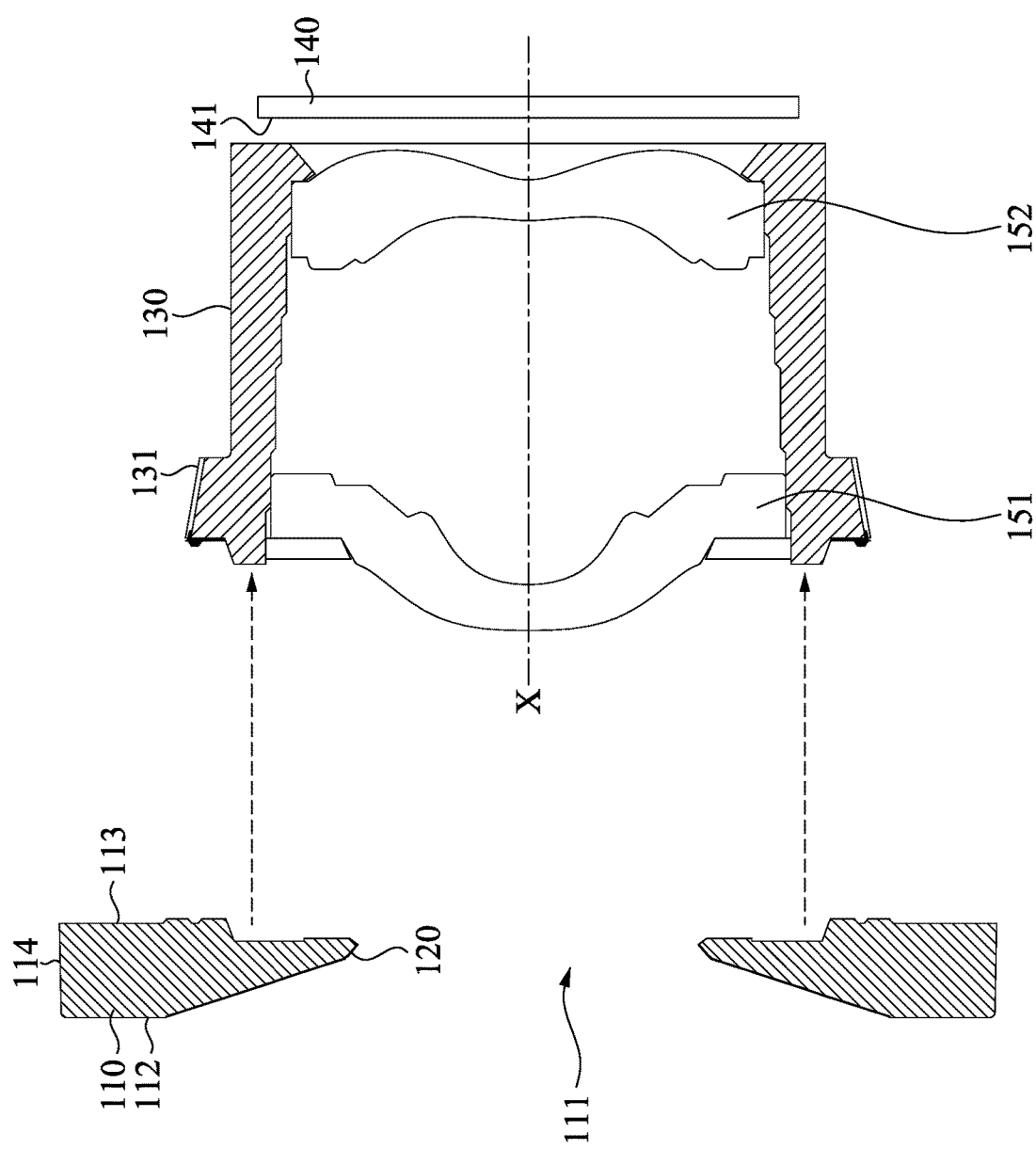
FIG. 1B is an assembling schematic view of the electronic device according to the 1st example in FIG. 1A.

FIG. 1A is a schematic view of an electronic device 10 according to the 1st example of the present disclosure. FIG. 1B is an assembling schematic view of an electronic device 10 according to the 1st example in FIG. 1A. In FIGS. 1A and 1B, the electronic device 10 includes a camera module (its reference numeral is omitted) and an image sensor 140, wherein the camera module includes an imaging lens assembly (its reference numeral is omitted), and the image sensor 140 is disposed on an image surface 141 of the camera module.

The imaging lens assembly includes a first optical element 110, a low-reflection layer 120 and a second optical element 130. The first optical element 110 has a central opening 111, and includes a first surface 112, a second surface 113 and a first outer diameter surface 114. The low-reflection layer 120 is located on at least one of the first surface 112 and the second surface 113, and includes a carbon black layer 121, a nano-microstructure 122 and a coating layer 123. According to the 1st example, the low-reflection layer 120 is located on the first surface 112, but is not limited thereto. The second optical element 130 includes a second outer diameter surface 131.

In particular, each of the first optical element 110 and the second optical element 130 can be a plastic product such as a lens barrel, a spacer, a retainer, a light blocking element or a light blocking sheet, and so on, but is not limited thereto. According to the 1st example, the first optical element 110 is the light blocking element, and the second optical element 130 is the lens barrel, but is not limited thereto.

In FIG. 1B, the second optical element 130 and the first optical element 110 are assembled to each other along a direction parallel to an optical axis X, and the first optical element 110 faces towards the second optical element 130. In detail, the imaging lens assembly includes at least one optical lens element. According to the 1st example, the imaging lens assembly includes optical lens elements 151, 152, the second optical element 130 is for accommodating the optical lens elements 151, 152, the first optical element 110 and the second optical element 130 face towards and are assembled to each other. That is, the first optical element 110 and the second optical element 130 are two-pieces assembly, wherein the optical elements can be disposed according to different imaging demands, such as the numbers, the structures, the surface shapes, and so on, and is not limited thereto. Therefore, the first surface 112 of the first optical element 110 has larger surface of the low-reflection layer 120 to eliminate the stray light from the external of the imaging lens assembly. Also, it is favorable for decreasing the background noise of the imaging to enhance the imaging sharpness.

Figure 1C:
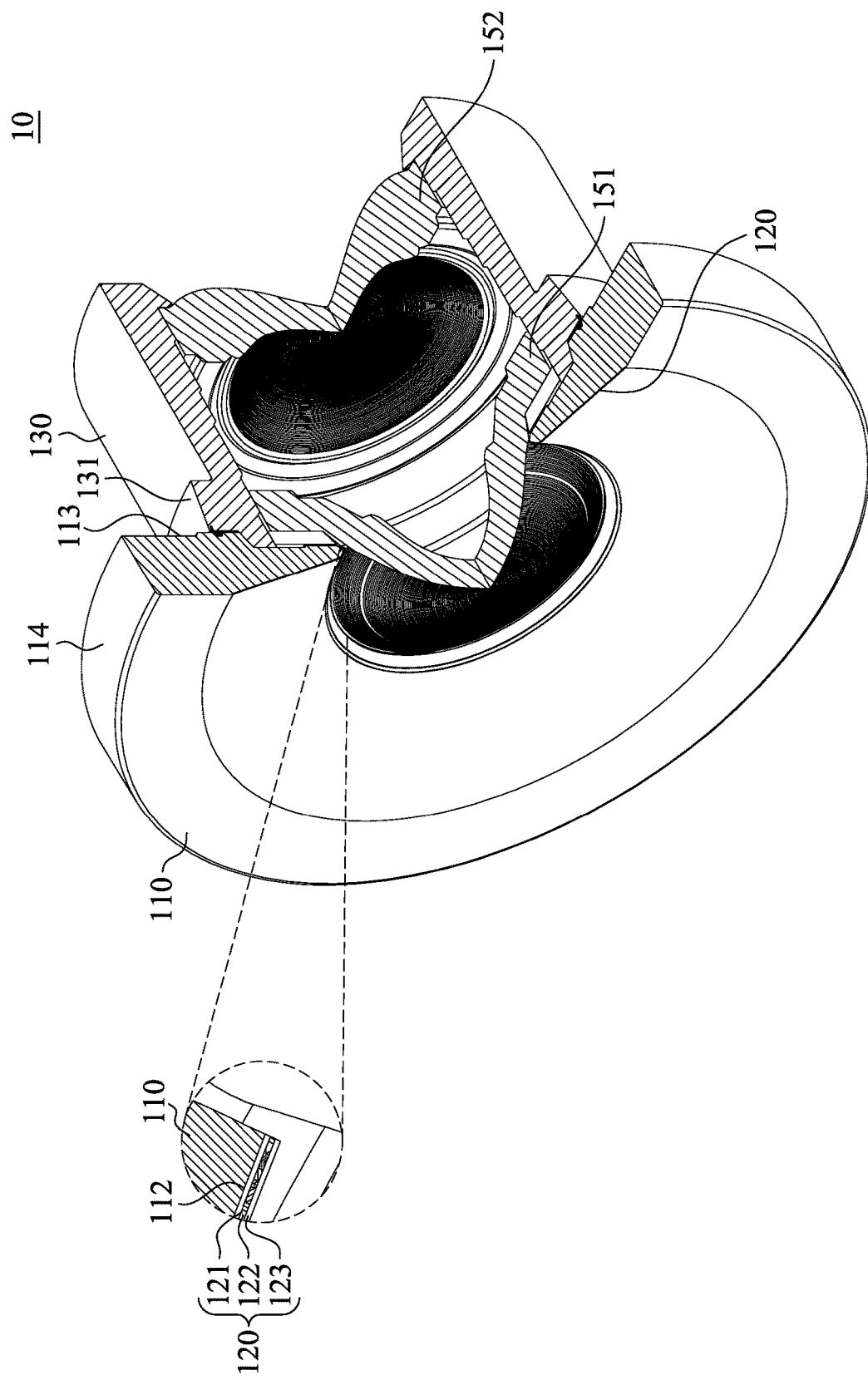
FIG. 1C is a partially cross-sectional view of the electronic device according to the 1st example in FIG. 1A.
Figure 1D:
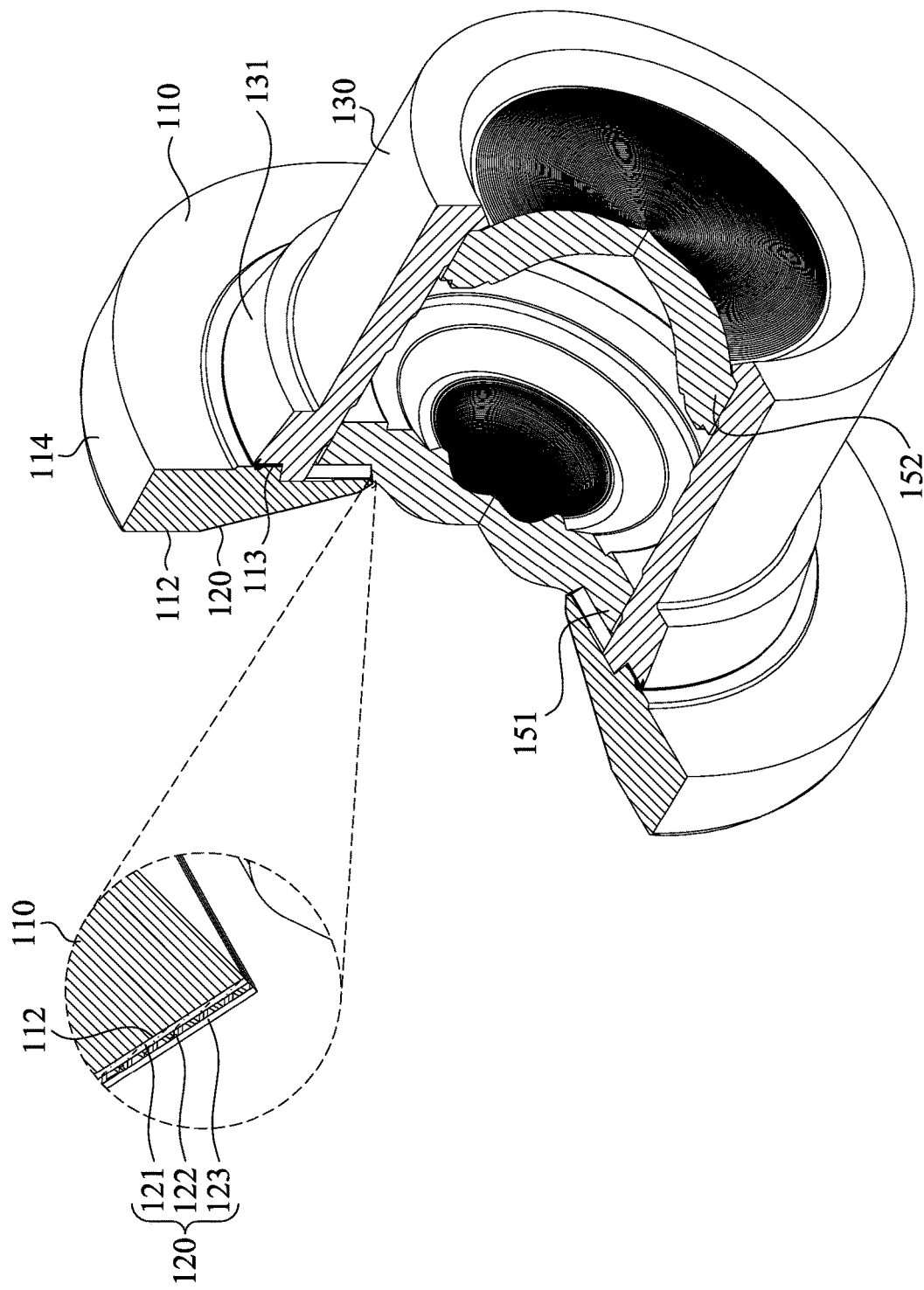
FIG. 1D is another partially cross-sectional view of the electronic device according to the 1st example in FIG. 1A.
Figure 1E:
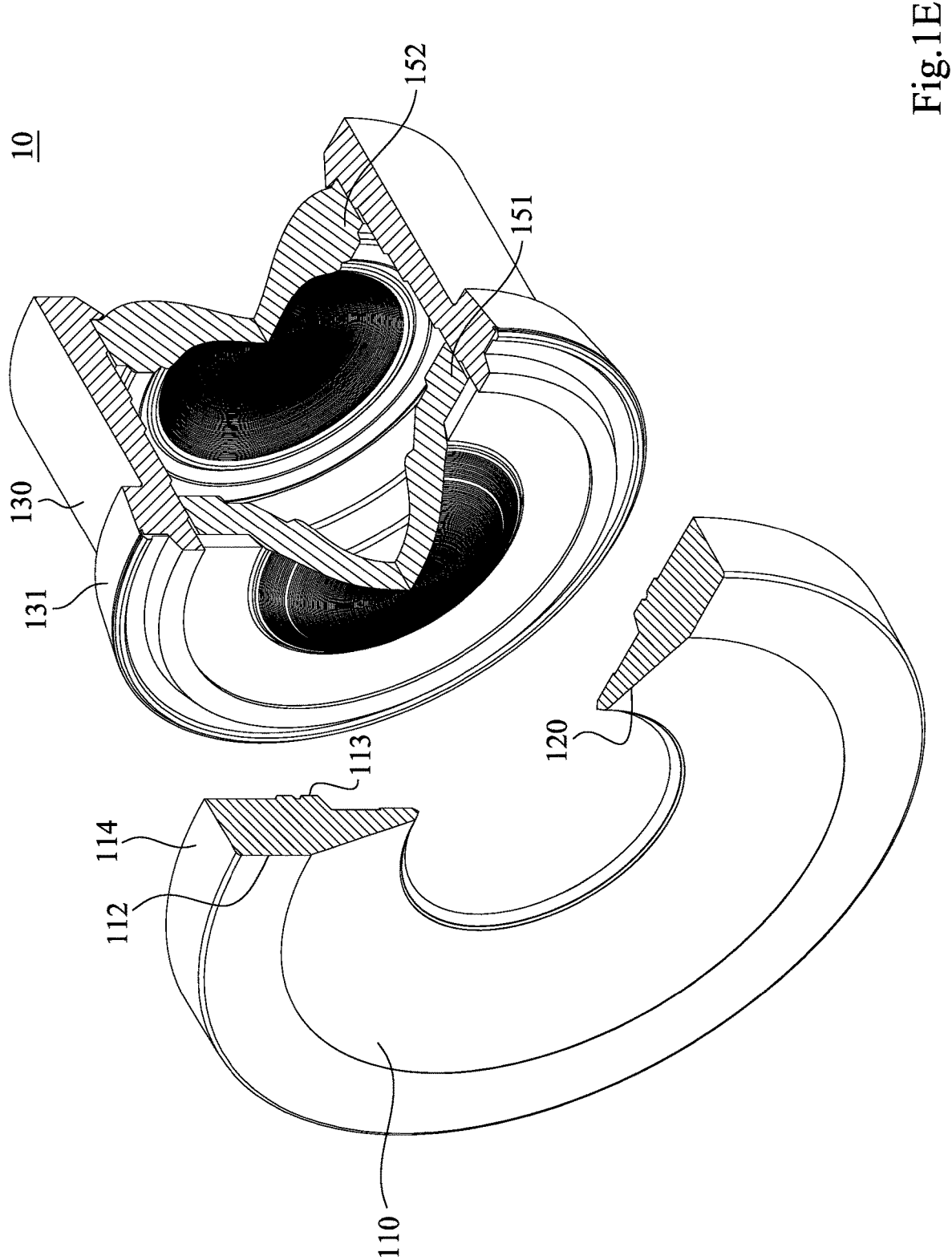
FIG. 1E is a partially exploded view of the electronic device according to the 1st example in FIG. 1A.
Figure 1F:
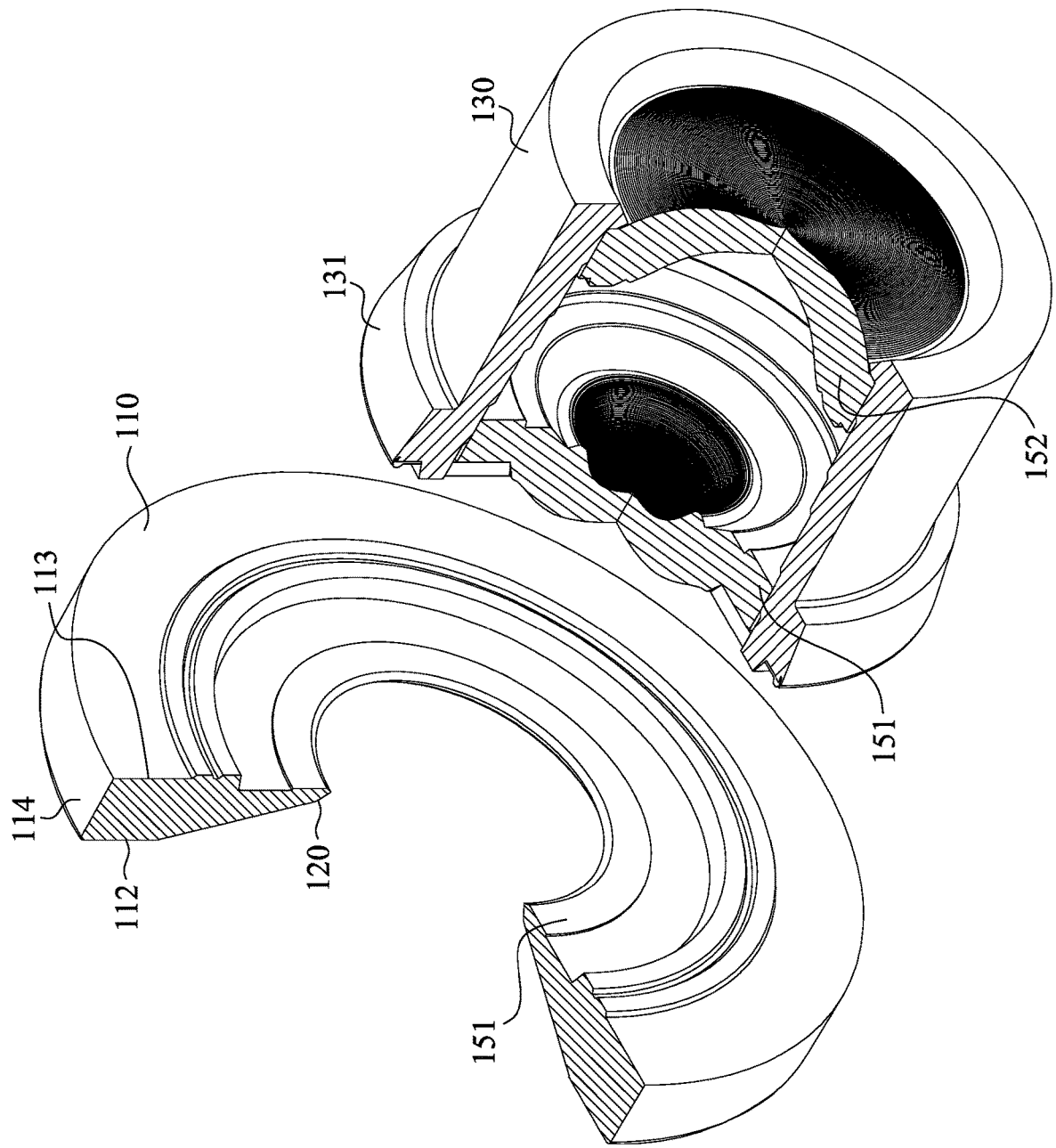
FIG. 1F is another partially exploded view of the electronic device according to the 1st example in FIG. 1A.

FIG. 1C is a partially cross-sectional view of the electronic device 10 according to the 1st example in FIG. 1A. FIG. 1D is another partially cross-sectional view of the electronic device 10 according to the 1st example in FIG. 1A. FIG. 1E is a partially exploded view of the electronic device 10 according to the 1st example in FIG. 1A. FIG. 1F is another partially exploded view of the electronic device 10 according to the 1st example in FIG. 1A. In FIGS. 1A to 1F, the first surface 112 faces towards one side of an object side and an image side of the imaging lens assembly and surrounds the central opening 111. The second surface 113 faces towards the other side of the object side and the image side of the imaging lens assembly and surrounds the central opening 111. The first outer diameter surface 114 is connected to the first surface 112 and the second surface 113. According to the 1st example, the first surface 112 faces towards the object side of the imaging lens assembly, and the second surface 113 faces towards the image side of the imaging lens assembly, but is not limited thereto. In particular, a gap does not exist between the first surface 112 and a surface of the first optical element 110 and between the second surface 113 and the surface of the first optical element 110.

In FIG. 1A, the first outer diameter surface 114 of the first optical element 110 has a diameter L1, and the second outer diameter surface 131 has a maximum diameter L2, wherein the maximum diameter L2 of the second outer diameter surface 131 is smaller than the diameter L1 of the first outer diameter surface 114 of the first optical element 110. In detail, the diameter L1 is 9.0079 mm, and the maximum diameter L2 is 6.5894 mm.

In FIGS. 1A and 1F, an appearance of the carbon black layer 121 is black, and is directly contacted with and connected to the at least one of the first surface 112 and the second surface 113. According to the 1st example, the carbon black layer 121 is directly contacted with and connected to the first surface 112, but is not limited thereto. The nano-microstructure 122 is a porous structure form, and is directly contacted with and connected to the carbon black layer 121. The nano-microstructure 122 is farther from the first optical element 110 than the carbon black layer 121 from the first optical element 110. The coating layer 123 is directly contacted with and connected to the nano-microstructure 122, and the coating layer 123 is farther from the first optical element 110 than the nano-microstructure 122 from the first optical element 110.

Moreover, the carbon black layer 121 is disposed on the first surface 112 of the first optical element 110 via a spray process. The nano-microstructure 122 is formed by the carbon black layer 121 treated via a special treatment. Hence, a composition of the nano-microstructure 122 is the same as a composition of the carbon black layer 121. In particular, the special treatment can be a surface roughening process of the carbon black layer 121, and then the nuclear reaction is performed on a surface of the carbon black layer 121 with a proper material, such as the physical vapor deposition, the chemical vapor deposition, the vacuum evaporation, the sputtering, the ion plating, and so on. That is, the surface roughening process can be regarded as the crystallization process. A surface structure with a nano-crystallization is formed via the crystallization process, and the surface structure of the nano-crystallization is the nano-microstructure 122. After forming the nano-microstructure 122, the coating layer 123 is disposed on an external of the nano-microstructure 122 to protect a nanostructure thereof. Therefore, it is favorable for strengthening the durability and the structural stability of the low-reflection layer 120. The carbon black layer 121 is directly contacted with and connected to the nano-microstructure 122, and the nano-microstructure 122 is directly contacted with and connected to the coating layer 123. Also, the gap does not exist between the carbon black layer 121 and the nano-microstructure 122 and between the nano-microstructure 122 and the coating layer 123.

In detail, a reflection intensity of the stray light is weakened by the extremely low reflectivity of the low-reflection layer 120 to further enhance the image quality. Further, different from techniques of prior art such as the inking process, the blasting process and the coating process, the insufficiency of the structural support of the low-reflection layer 120 is improved by the low-reflection layer 120. The coating layer 123 can be a single-layer film. Although the better anti-reflection effect can be obtained via a multi-layer film of prior art, a process of prior art is more complicated and high-cost, and the aforementioned problem can be improved by the present disclosure. By a choice of a material of the coating layer 123, surface characteristics of the low-reflection layer 120 can be further changed, for example, the anti-oxidation ability can be enhanced; the light intensity of the light reflecting from a surface can be decreased, and so on.

The coating layer 123 can be made of a metal oxide, and the metal oxide can be a titanic oxide, an aluminum oxide, a metal nitride, a metal fluoride, and so on, wherein the titanic oxide is a high refractivity material to lower the light intensity of the light reflecting from the surface of the low-reflection layer 120. According to the 1st example, the coating layer 123 is made of the titanic oxide, and a refractive index of the titanic oxide is 2.34. Therefore, a surface hardness and an abrasion resistance of the low-reflection layer 120 can be further enhanced. Also, by a characteristic of the refractive index of different materials of the coating layer 123, a graded index can be obtained between the low-reflection layer 120 and an air to lower the light intensity of the light reflecting from the surface of the low-reflection layer 120.

In detail, a grain pitch of the nano-microstructure 122 is GP, and the grain pitch GP of the nano-microstructure 122 is a minimum distance between peaks of each of grains. According to the 1st example, the grain pitch GP of the nano-microstructure 122 is 39 nm.

Figure 1G:
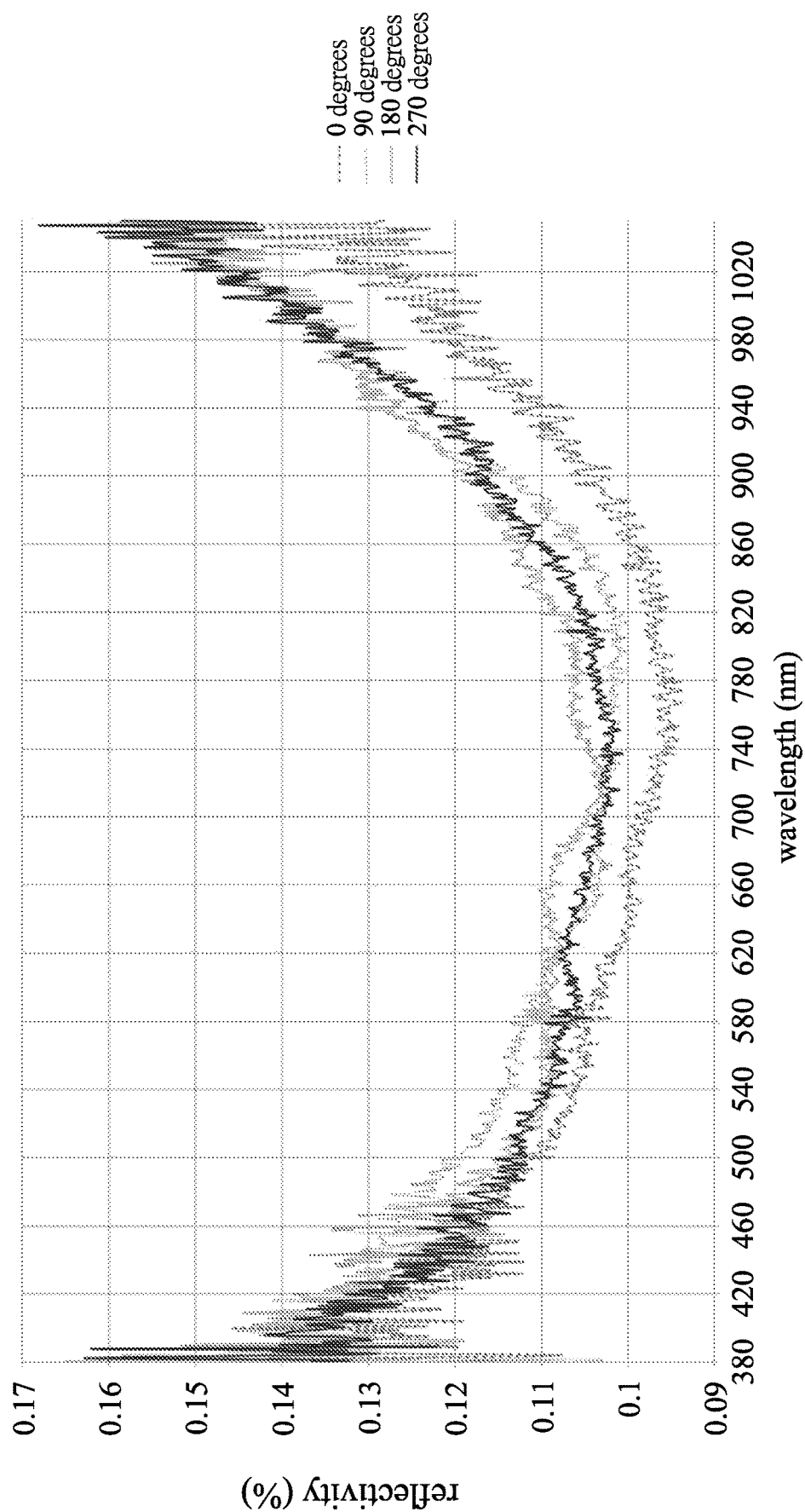
FIG. 1G is a schematic view of a reflectivity result according to the 1st example in FIG. 1A.

FIG. 1G is a schematic view of a reflectivity result according to the 1st example in FIG. 1A. Table 1 shows measurement results of a reflectivity of the low-reflection layer 120 at wavelengths of 380 nm to 1050 nm when each of rotation angles of the imaging lens assembly is 0 degrees, 90 degrees, 180 degrees and 270 degrees, wherein the measurement results of the reflectivity are obtained via the imaging lens assembly according to the 1st example, each of rotation angles of the imaging lens assembly according to the 1st example is 0 degrees, 90 degrees, 180 degrees and 270 degrees, and wavelengths of 400 nm to 700 nm are the wave range of the visible light.

TABLE 1

| wavelength (nm) | 0 degrees (%) | 90 degrees (%) | 180 degrees (%) | 270 degrees (%) |
| --- | --- | --- | --- | --- |
| 380 | 0.1649 | 0.1649 | 0.1592 | 0.1365 |
| 381 | 0.1326 | 0.103 | 0.1326 | 0.1326 |

TABLE 1-continued

| wavelength (nm) | 0 degrees (%) | 90 degrees (%) | 180 degrees (%) | 270 degrees (%) |
| --- | --- | --- | --- | --- |
| 382 | 0.141 | 0.162 | 0.162 | 0.162 |
| 383 | 0.1133 | 0.1529 | 0.1529 | 0.1529 |
| 384 | 0.1078 | 0.1579 | 0.1347 | 0.1347 |
| 385 | 0.129 | 0.1261 | 0.129 | 0.129 |
| 386 | 0.1411 | 0.1263 | 0.1411 | 0.1411 |
| 387 | 0.1469 | 0.133 | 0.1469 | 0.133 |
| 388 | 0.1459 | 0.162 | 0.1459 | 0.162 |
| 389 | 0.1197 | 0.1425 | 0.1254 | 0.1225 |
| 390 | 0.1212 | 0.1515 | 0.1515 | 0.1401 |
| 391 | 0.126 | 0.144 | 0.1322 | 0.1322 |
| 392 | 0.1352 | 0.1367 | 0.1196 | 0.1352 |
| 393 | 0.1325 | 0.1325 | 0.119 | 0.1297 |
| 394 | 0.1394 | 0.1328 | 0.1328 | 0.1306 |
| 395 | 0.1233 | 0.1389 | 0.1389 | 0.1335 |
| 396 | 0.1275 | 0.1427 | 0.1292 | 0.1418 |
| 397 | 0.126 | 0.1397 | 0.1397 | 0.1397 |
| 398 | 0.1318 | 0.145 | 0.139 | 0.139 |
| 399 | 0.127 | 0.1397 | 0.136 | 0.136 |
| 400 | 0.1458 | 0.1344 | 0.1344 | 0.1344 |
| 401 | 0.1235 | 0.1353 | 0.1327 | 0.1327 |
| 402 | 0.1317 | 0.1432 | 0.1372 | 0.1372 |
| 403 | 0.1305 | 0.1416 | 0.1416 | 0.1334 |
| 404 | 0.1189 | 0.1405 | 0.1297 | 0.1297 |
| 405 | 0.128 | 0.1384 | 0.1358 | 0.1384 |
| 406 | 0.1314 | 0.1415 | 0.1314 | 0.1364 |
| 407 | 0.1346 | 0.1369 | 0.1346 | 0.1346 |
| 408 | 0.1329 | 0.1423 | 0.1331 | 0.1329 |
| 409 | 0.1352 | 0.1444 | 0.1444 | 0.1352 |
| 410 | 0.1249 | 0.1386 | 0.1386 | 0.1297 |
| 411 | 0.1215 | 0.132 | 0.132 | 0.1371 |
| 412 | 0.1264 | 0.1344 | 0.1344 | 0.1268 |
| 413 | 0.1301 | 0.1301 | 0.1301 | 0.1358 |
| 414 | 0.1262 | 0.1262 | 0.1262 | 0.1262 |
| 415 | 0.1284 | 0.1346 | 0.1346 | 0.1346 |
| 416 | 0.1263 | 0.1411 | 0.1343 | 0.1337 |
| 417 | 0.1231 | 0.1376 | 0.1376 | 0.1279 |
| 418 | 0.1238 | 0.1379 | 0.1338 | 0.128 |
| 419 | 0.1289 | 0.1368 | 0.13 | 0.13 |
| 420 | 0.126 | 0.1386 | 0.1326 | 0.1326 |
| 421 | 0.1218 | 0.1283 | 0.126 | 0.126 |
| 422 | 0.1271 | 0.1335 | 0.1349 | 0.131 |
| 423 | 0.1191 | 0.1308 | 0.1316 | 0.1253 |
| 424 | 0.1221 | 0.1343 | 0.129 | 0.1282 |
| 425 | 0.1222 | 0.1319 | 0.1319 | 0.1282 |
| 426 | 0.1237 | 0.1296 | 0.1258 | 0.1258 |
| 427 | 0.1269 | 0.1327 | 0.1269 | 0.1321 |
| 428 | 0.1209 | 0.1266 | 0.1266 | 0.1209 |
| 429 | 0.1196 | 0.1299 | 0.1276 | 0.1243 |
| 430 | 0.1158 | 0.1288 | 0.127 | 0.1232 |
| 431 | 0.1217 | 0.1328 | 0.1277 | 0.1273 |
| 432 | 0.1123 | 0.1278 | 0.1223 | 0.1223 |
| 433 | 0.1204 | 0.1313 | 0.1258 | 0.1258 |
| 434 | 0.1159 | 0.1268 | 0.1251 | 0.1213 |
| 435 | 0.1187 | 0.1295 | 0.1243 | 0.1241 |
| 436 | 0.1216 | 0.1335 | 0.1269 | 0.1269 |
| 437 | 0.1154 | 0.1315 | 0.1207 | 0.1207 |
| 438 | 0.1179 | 0.1339 | 0.1232 | 0.127 |
| 439 | 0.1123 | 0.1283 | 0.1228 | 0.1178 |
| 440 | 0.1264 | 0.1328 | 0.1222 | 0.1222 |
| 441 | 0.1193 | 0.1299 | 0.1193 | 0.1218 |
| 442 | 0.1163 | 0.1268 | 0.1201 | 0.1216 |
| 443 | 0.121 | 0.1367 | 0.1314 | 0.1263 |
| 444 | 0.1127 | 0.1273 | 0.1249 | 0.118 |
| 445 | 0.1204 | 0.1308 | 0.1253 | 0.1231 |
| 446 | 0.1162 | 0.1304 | 0.1228 | 0.1237 |
| 447 | 0.1245 | 0.13 | 0.1246 | 0.1197 |
| 448 | 0.1162 | 0.1253 | 0.1202 | 0.1162 |
| 449 | 0.1209 | 0.1286 | 0.1259 | 0.1234 |
| 450 | 0.1141 | 0.1281 | 0.1243 | 0.1192 |
| 451 | 0.1126 | 0.128 | 0.1178 | 0.1177 |
| 452 | 0.1169 | 0.1283 | 0.122 | 0.1194 |
| 453 | 0.1185 | 0.1287 | 0.1211 | 0.1212 |
| 454 | 0.1201 | 0.1288 | 0.1201 | 0.1188 |
| 455 | 0.1144 | 0.1243 | 0.1144 | 0.1193 |
| 456 | 0.1183 | 0.1293 | 0.1244 | 0.1195 |
| 457 | 0.1172 | 0.1342 | 0.1269 | 0.122 |
| 458 | 0.1161 | 0.1318 | 0.1258 | 0.1209 |

TABLE 1-continued

| wavelength (nm) | 0 degrees (%) | 90 degrees (%) | 180 degrees (%) | 270 degrees (%) |
|---|---|---|---|---|
| 459 | 0.1196 | 0.134 | 0.1244 | 0.1244 |
| 460 | 0.1158 | 0.1253 | 0.1194 | 0.1182 |
| 461 | 0.1187 | 0.1257 | 0.1187 | 0.1164 |
| 462 | 0.1181 | 0.1262 | 0.1216 | 0.1181 |
| 463 | 0.1221 | 0.1266 | 0.1221 | 0.1176 |
| 464 | 0.1169 | 0.1269 | 0.1225 | 0.1202 |
| 465 | 0.1158 | 0.129 | 0.1268 | 0.1181 |
| 466 | 0.1214 | 0.131 | 0.1245 | 0.1224 |
| 467 | 0.1138 | 0.1222 | 0.118 | 0.1138 |
| 468 | 0.1164 | 0.1247 | 0.1206 | 0.1164 |
| 469 | 0.1169 | 0.1249 | 0.1188 | 0.1169 |
| 470 | 0.1174 | 0.1283 | 0.1204 | 0.1174 |
| 471 | 0.1121 | 0.1236 | 0.1197 | 0.1196 |
| 472 | 0.1193 | 0.1278 | 0.1241 | 0.1203 |
| 473 | 0.1138 | 0.1248 | 0.1192 | 0.1174 |
| 474 | 0.1164 | 0.1216 | 0.12 | 0.1145 |
| 475 | 0.1149 | 0.1185 | 0.1184 | 0.1149 |
| 476 | 0.1151 | 0.1218 | 0.1194 | 0.116 |
| 477 | 0.1137 | 0.1238 | 0.1203 | 0.117 |
| 478 | 0.1145 | 0.1273 | 0.1209 | 0.1177 |
| 479 | 0.1153 | 0.1246 | 0.1184 | 0.1183 |
| 480 | 0.1151 | 0.1242 | 0.1181 | 0.1159 |
| 481 | 0.1134 | 0.1222 | 0.1163 | 0.1147 |
| 482 | 0.1161 | 0.1224 | 0.1167 | 0.1138 |
| 483 | 0.1145 | 0.123 | 0.1174 | 0.1146 |
| 484 | 0.1142 | 0.1251 | 0.1197 | 0.117 |
| 485 | 0.113 | 0.1221 | 0.1183 | 0.1142 |
| 486 | 0.1136 | 0.1235 | 0.1188 | 0.1136 |
| 487 | 0.1144 | 0.1218 | 0.1168 | 0.112 |
| 488 | 0.1157 | 0.1214 | 0.1172 | 0.1157 |
| 489 | 0.1128 | 0.1214 | 0.1163 | 0.1128 |
| 490 | 0.1132 | 0.1227 | 0.1156 | 0.1132 |
| 491 | 0.1116 | 0.123 | 0.1184 | 0.1139 |
| 492 | 0.1134 | 0.1218 | 0.118 | 0.115 |
| 493 | 0.1111 | 0.1203 | 0.1156 | 0.1124 |
| 494 | 0.1122 | 0.1213 | 0.1148 | 0.1144 |
| 495 | 0.1128 | 0.1193 | 0.115 | 0.1147 |
| 496 | 0.1117 | 0.12 | 0.1152 | 0.1117 |
| 497 | 0.1133 | 0.1215 | 0.1154 | 0.1133 |
| 498 | 0.1118 | 0.1214 | 0.1154 | 0.1135 |
| 499 | 0.1114 | 0.1211 | 0.1156 | 0.1153 |
| 500 | 0.1086 | 0.1182 | 0.115 | 0.1118 |
| 501 | 0.111 | 0.1193 | 0.1137 | 0.1118 |
| 502 | 0.1118 | 0.1192 | 0.1137 | 0.1134 |
| 503 | 0.1101 | 0.1191 | 0.1137 | 0.1119 |
| 504 | 0.1101 | 0.1189 | 0.1136 | 0.1124 |
| 505 | 0.1091 | 0.1188 | 0.1146 | 0.1126 |
| 506 | 0.1084 | 0.1186 | 0.1138 | 0.1118 |
| 507 | 0.1103 | 0.117 | 0.1137 | 0.1135 |
| 508 | 0.1104 | 0.117 | 0.1132 | 0.1126 |
| 509 | 0.1103 | 0.1168 | 0.1119 | 0.1126 |
| 510 | 0.1089 | 0.1166 | 0.1118 | 0.1118 |
| 511 | 0.1086 | 0.1179 | 0.1145 | 0.1133 |
| 512 | 0.108 | 0.1172 | 0.1121 | 0.1126 |
| 513 | 0.1092 | 0.1182 | 0.1134 | 0.1137 |
| 514 | 0.1079 | 0.1168 | 0.1121 | 0.1123 |
| 515 | 0.1093 | 0.1165 | 0.1121 | 0.1123 |
| 516 | 0.109 | 0.1157 | 0.1109 | 0.1118 |
| 517 | 0.1082 | 0.1167 | 0.111 | 0.111 |
| 518 | 0.1073 | 0.1157 | 0.1101 | 0.1113 |
| 519 | 0.1076 | 0.1159 | 0.1116 | 0.1129 |
| 520 | 0.1082 | 0.1169 | 0.1119 | 0.1124 |
| 521 | 0.1077 | 0.1155 | 0.1115 | 0.1128 |
| 522 | 0.1086 | 0.1153 | 0.1102 | 0.1115 |
| 523 | 0.1078 | 0.1155 | 0.1104 | 0.1116 |
| 524 | 0.1073 | 0.1148 | 0.1099 | 0.1109 |
| 525 | 0.1071 | 0.1161 | 0.1104 | 0.1114 |
| 526 | 0.1081 | 0.117 | 0.1119 | 0.113 |
| 527 | 0.1063 | 0.1161 | 0.1101 | 0.1112 |
| 528 | 0.107 | 0.115 | 0.1103 | 0.1108 |
| 529 | 0.1068 | 0.1147 | 0.1093 | 0.1105 |
| 530 | 0.1069 | 0.1153 | 0.1093 | 0.1105 |
| 531 | 0.1062 | 0.1158 | 0.1097 | 0.1098 |
| 532 | 0.106 | 0.1149 | 0.1093 | 0.1101 |
| 533 | 0.1061 | 0.1149 | 0.1101 | 0.1101 |
| 534 | 0.1062 | 0.1157 | 0.1098 | 0.1109 |
| 535 | 0.1067 | 0.1148 | 0.1091 | 0.1092 |
| 536 | 0.1065 | 0.114 | 0.1088 | 0.1096 |
| 537 | 0.1066 | 0.1141 | 0.1082 | 0.109 |
| 538 | 0.1071 | 0.1151 | 0.1114 | 0.1105 |
| 539 | 0.1058 | 0.1141 | 0.1094 | 0.1092 |
| 540 | 0.1063 | 0.1151 | 0.1105 | 0.1093 |
| 541 | 0.106 | 0.114 | 0.1094 | 0.109 |
| 542 | 0.1057 | 0.1127 | 0.1091 | 0.1071 |
| 543 | 0.1066 | 0.1135 | 0.1089 | 0.1099 |
| 544 | 0.106 | 0.1138 | 0.1093 | 0.1088 |
| 545 | 0.1054 | 0.1138 | 0.11 | 0.1088 |
| 546 | 0.1056 | 0.1136 | 0.1102 | 0.109 |
| 547 | 0.1047 | 0.1139 | 0.1094 | 0.1081 |
| 548 | 0.105 | 0.1138 | 0.1095 | 0.1081 |
| 549 | 0.1062 | 0.1128 | 0.1078 | 0.1078 |
| 550 | 0.106 | 0.1139 | 0.1092 | 0.1072 |
| 551 | 0.1064 | 0.1135 | 0.1089 | 0.1088 |
| 552 | 0.1061 | 0.114 | 0.1097 | 0.1089 |
| 553 | 0.1053 | 0.114 | 0.1102 | 0.1088 |
| 554 | 0.1039 | 0.1133 | 0.1099 | 0.1085 |
| 555 | 0.1053 | 0.1125 | 0.1089 | 0.1077 |
| 556 | 0.1046 | 0.1122 | 0.1082 | 0.107 |
| 557 | 0.1052 | 0.113 | 0.1088 | 0.1083 |
| 558 | 0.1045 | 0.1128 | 0.1092 | 0.1072 |
| 559 | 0.1058 | 0.1145 | 0.1108 | 0.1095 |
| 560 | 0.1043 | 0.1135 | 0.1093 | 0.108 |
| 561 | 0.105 | 0.1132 | 0.1093 | 0.1088 |
| 562 | 0.1047 | 0.1135 | 0.1084 | 0.1084 |
| 563 | 0.1075 | 0.1126 | 0.1101 | 0.1088 |
| 564 | 0.1062 | 0.1139 | 0.1091 | 0.1078 |
| 565 | 0.1055 | 0.1132 | 0.1087 | 0.1081 |
| 566 | 0.1057 | 0.1125 | 0.1093 | 0.1083 |
| 567 | 0.1034 | 0.1124 | 0.1098 | 0.1085 |
| 568 | 0.1048 | 0.1129 | 0.109 | 0.1087 |
| 569 | 0.1049 | 0.1134 | 0.1095 | 0.1082 |
| 570 | 0.105 | 0.112 | 0.109 | 0.1077 |
| 571 | 0.1062 | 0.1128 | 0.1101 | 0.1088 |
| 572 | 0.1051 | 0.113 | 0.1093 | 0.1077 |
| 573 | 0.1046 | 0.1126 | 0.1094 | 0.1073 |
| 574 | 0.1043 | 0.1123 | 0.1101 | 0.1079 |
| 575 | 0.1052 | 0.1119 | 0.1094 | 0.1079 |
| 576 | 0.1043 | 0.1121 | 0.1092 | 0.1067 |
| 577 | 0.1062 | 0.1123 | 0.1089 | 0.1075 |
| 578 | 0.1058 | 0.1112 | 0.1085 | 0.1072 |
| 579 | 0.1072 | 0.1137 | 0.1098 | 0.1097 |
| 580 | 0.1044 | 0.1122 | 0.1109 | 0.1069 |
| 581 | 0.104 | 0.1112 | 0.1094 | 0.1064 |
| 582 | 0.102 | 0.11 | 0.1073 | 0.1044 |
| 583 | 0.1074 | 0.1133 | 0.1117 | 0.1088 |
| 584 | 0.1052 | 0.1107 | 0.1104 | 0.1066 |
| 585 | 0.1051 | 0.1105 | 0.1087 | 0.1069 |
| 586 | 0.106 | 0.1123 | 0.1115 | 0.1079 |
| 587 | 0.1038 | 0.1106 | 0.1092 | 0.1063 |
| 588 | 0.1027 | 0.1108 | 0.1081 | 0.1054 |
| 589 | 0.1039 | 0.1111 | 0.1092 | 0.1061 |
| 590 | 0.105 | 0.1111 | 0.1104 | 0.1063 |
| 591 | 0.1037 | 0.1115 | 0.1091 | 0.1061 |
| 592 | 0.104 | 0.1107 | 0.1093 | 0.1054 |
| 593 | 0.1035 | 0.1111 | 0.1088 | 0.1061 |
| 594 | 0.1028 | 0.1101 | 0.1094 | 0.1061 |
| 595 | 0.1023 | 0.1091 | 0.1091 | 0.1052 |
| 596 | 0.1043 | 0.1121 | 0.1095 | 0.1069 |
| 597 | 0.1027 | 0.1092 | 0.1092 | 0.1063 |
| 598 | 0.1038 | 0.1102 | 0.1096 | 0.1063 |
| 599 | 0.104 | 0.1095 | 0.1091 | 0.1056 |
| 600 | 0.1024 | 0.1099 | 0.1087 | 0.1061 |
| 601 | 0.1022 | 0.1099 | 0.1086 | 0.106 |
| 602 | 0.1029 | 0.1105 | 0.1092 | 0.1073 |
| 603 | 0.1025 | 0.1093 | 0.108 | 0.1059 |
| 604 | 0.1033 | 0.1096 | 0.1083 | 0.107 |
| 605 | 0.1031 | 0.1094 | 0.1081 | 0.1058 |
| 606 | 0.1036 | 0.1099 | 0.1086 | 0.1068 |
| 607 | 0.1031 | 0.1094 | 0.1089 | 0.1064 |
| 608 | 0.1015 | 0.1099 | 0.1088 | 0.1074 |
| 609 | 0.103 | 0.1102 | 0.1091 | 0.1067 |
| 610 | 0.1031 | 0.1092 | 0.1087 | 0.1068 |
| 611 | 0.1037 | 0.1098 | 0.1093 | 0.1073 |
| 612 | 0.1038 | 0.1098 | 0.1098 | 0.1074 |

TABLE 1-continued

| wavelength (nm) | 0 degrees (%) | 90 degrees (%) | 180 degrees (%) | 270 degrees (%) |
|---|---|---|---|---|
| 613 | 0.103 | 0.1089 | 0.1079 | 0.1067 |
| 614 | 0.1016 | 0.1083 | 0.1079 | 0.1067 |
| 615 | 0.102 | 0.1094 | 0.1096 | 0.1071 |
| 616 | 0.1015 | 0.1094 | 0.1096 | 0.108 |
| 617 | 0.1017 | 0.1095 | 0.1074 | 0.1073 |
| 618 | 0.1028 | 0.1085 | 0.1085 | 0.1073 |
| 619 | 0.1013 | 0.1075 | 0.1081 | 0.107 |
| 620 | 0.1017 | 0.1084 | 0.1095 | 0.1075 |
| 621 | 0.1014 | 0.1081 | 0.1092 | 0.108 |
| 622 | 0.101 | 0.1084 | 0.1098 | 0.1073 |
| 623 | 0.1007 | 0.1072 | 0.1088 | 0.1067 |
| 624 | 0.1013 | 0.1078 | 0.108 | 0.107 |
| 625 | 0.1013 | 0.1067 | 0.1078 | 0.1056 |
| 626 | 0.1007 | 0.1071 | 0.1082 | 0.1071 |
| 627 | 0.1002 | 0.1066 | 0.1082 | 0.1066 |
| 628 | 0.0998 | 0.107 | 0.1084 | 0.107 |
| 629 | 0.1004 | 0.1069 | 0.109 | 0.1079 |
| 630 | 0.1007 | 0.1071 | 0.109 | 0.1069 |
| 631 | 0.1005 | 0.107 | 0.1085 | 0.1069 |
| 632 | 0.1001 | 0.1065 | 0.1079 | 0.1069 |
| 633 | 0.1006 | 0.107 | 0.1091 | 0.107 |
| 634 | 0.1005 | 0.1061 | 0.1086 | 0.1071 |
| 635 | 0.0998 | 0.1062 | 0.1096 | 0.1069 |
| 636 | 0.0993 | 0.1064 | 0.1093 | 0.1064 |
| 637 | 0.1001 | 0.1057 | 0.1089 | 0.1066 |
| 638 | 0.1003 | 0.1056 | 0.109 | 0.1066 |
| 639 | 0.1001 | 0.1048 | 0.1087 | 0.1055 |
| 640 | 0.0996 | 0.105 | 0.1082 | 0.1057 |
| 641 | 0.0998 | 0.1053 | 0.1095 | 0.1063 |
| 642 | 0.099 | 0.1045 | 0.1097 | 0.1065 |
| 643 | 0.099 | 0.1048 | 0.1085 | 0.1059 |
| 644 | 0.0992 | 0.1051 | 0.1095 | 0.1062 |
| 645 | 0.1 | 0.1046 | 0.109 | 0.1057 |
| 646 | 0.1003 | 0.1057 | 0.1091 | 0.1068 |
| 647 | 0.1003 | 0.1047 | 0.1095 | 0.1058 |
| 648 | 0.0999 | 0.1037 | 0.1099 | 0.1055 |
| 649 | 0.0986 | 0.1037 | 0.1095 | 0.105 |
| 650 | 0.0985 | 0.1041 | 0.1097 | 0.1052 |
| 651 | 0.0984 | 0.1034 | 0.1098 | 0.1048 |
| 652 | 0.0997 | 0.1037 | 0.1093 | 0.1053 |
| 653 | 0.1002 | 0.1038 | 0.1086 | 0.105 |
| 654 | 0.0995 | 0.1029 | 0.1086 | 0.1052 |
| 655 | 0.0997 | 0.1042 | 0.1096 | 0.1062 |
| 656 | 0.0998 | 0.1043 | 0.11 | 0.106 |
| 657 | 0.0999 | 0.1036 | 0.1104 | 0.1058 |
| 658 | 0.0999 | 0.1033 | 0.109 | 0.1044 |
| 659 | 0.1002 | 0.1036 | 0.109 | 0.1047 |
| 660 | 0.1005 | 0.1039 | 0.1084 | 0.105 |
| 661 | 0.099 | 0.1032 | 0.1078 | 0.1052 |
| 662 | 0.0998 | 0.1032 | 0.1088 | 0.1044 |
| 663 | 0.0996 | 0.1032 | 0.1089 | 0.1053 |
| 664 | 0.0993 | 0.1033 | 0.109 | 0.1044 |
| 665 | 0.1006 | 0.104 | 0.1089 | 0.1052 |
| 666 | 0.101 | 0.1044 | 0.109 | 0.1055 |
| 667 | 0.0998 | 0.1032 | 0.1089 | 0.1053 |
| 668 | 0.1002 | 0.1032 | 0.1084 | 0.1043 |
| 669 | 0.0995 | 0.1032 | 0.1085 | 0.1043 |
| 670 | 0.0987 | 0.1023 | 0.109 | 0.1044 |
| 671 | 0.0989 | 0.1032 | 0.109 | 0.1044 |
| 672 | 0.0999 | 0.1018 | 0.1082 | 0.1041 |
| 673 | 0.1 | 0.1032 | 0.1075 | 0.1041 |
| 674 | 0.1 | 0.1027 | 0.108 | 0.1046 |
| 675 | 0.1001 | 0.1035 | 0.1082 | 0.1047 |
| 676 | 0.0994 | 0.1032 | 0.1086 | 0.1044 |
| 677 | 0.0987 | 0.1033 | 0.1078 | 0.1044 |
| 678 | 0.0993 | 0.1039 | 0.1085 | 0.1051 |
| 679 | 0.0995 | 0.104 | 0.1075 | 0.1051 |
| 680 | 0.1005 | 0.1032 | 0.1071 | 0.104 |
| 681 | 0.1005 | 0.1034 | 0.1063 | 0.104 |
| 682 | 0.1004 | 0.1036 | 0.107 | 0.1047 |
| 683 | 0.0991 | 0.1037 | 0.1083 | 0.1037 |
| 684 | 0.0981 | 0.1028 | 0.1065 | 0.1028 |
| 685 | 0.0989 | 0.1029 | 0.1069 | 0.1035 |
| 686 | 0.0987 | 0.1031 | 0.1057 | 0.1034 |
| 687 | 0.0997 | 0.1032 | 0.1055 | 0.1032 |
| 688 | 0.0998 | 0.1042 | 0.1068 | 0.1042 |
| 689 | 0.0994 | 0.1035 | 0.1064 | 0.1035 |
| 690 | 0.0981 | 0.1035 | 0.105 | 0.1027 |
| 691 | 0.0989 | 0.1036 | 0.1059 | 0.1035 |
| 692 | 0.098 | 0.1036 | 0.1059 | 0.1034 |
| 693 | 0.0994 | 0.1041 | 0.1059 | 0.1029 |
| 694 | 0.0992 | 0.1038 | 0.105 | 0.1035 |
| 695 | 0.0998 | 0.1033 | 0.1045 | 0.1044 |
| 696 | 0.0984 | 0.1032 | 0.1054 | 0.1032 |
| 697 | 0.0973 | 0.1036 | 0.1048 | 0.1031 |
| 698 | 0.0973 | 0.1035 | 0.1046 | 0.1031 |
| 699 | 0.0982 | 0.104 | 0.1051 | 0.104 |
| 700 | 0.0993 | 0.1039 | 0.1049 | 0.1037 |
| 701 | 0.0988 | 0.1038 | 0.1043 | 0.1027 |
| 702 | 0.0987 | 0.1038 | 0.1042 | 0.1026 |
| 703 | 0.0972 | 0.1028 | 0.1048 | 0.1026 |
| 704 | 0.0978 | 0.1037 | 0.1049 | 0.1027 |
| 705 | 0.0962 | 0.1031 | 0.1043 | 0.1027 |
| 706 | 0.097 | 0.1033 | 0.1044 | 0.1028 |
| 707 | 0.098 | 0.1028 | 0.104 | 0.1018 |
| 708 | 0.0992 | 0.1039 | 0.1039 | 0.1028 |
| 709 | 0.0975 | 0.1021 | 0.1033 | 0.1021 |
| 710 | 0.0972 | 0.1024 | 0.1036 | 0.1024 |
| 711 | 0.0963 | 0.1021 | 0.1032 | 0.1021 |
| 712 | 0.0965 | 0.1034 | 0.1023 | 0.1023 |
| 713 | 0.0968 | 0.1026 | 0.1029 | 0.1026 |
| 714 | 0.0969 | 0.1028 | 0.1033 | 0.1022 |
| 715 | 0.0981 | 0.103 | 0.103 | 0.1019 |
| 716 | 0.0974 | 0.1021 | 0.1033 | 0.101 |
| 717 | 0.0971 | 0.1033 | 0.1036 | 0.1024 |
| 718 | 0.0962 | 0.1027 | 0.1039 | 0.1027 |
| 719 | 0.097 | 0.1029 | 0.1032 | 0.1029 |
| 720 | 0.0961 | 0.102 | 0.1032 | 0.1032 |
| 721 | 0.0974 | 0.1024 | 0.1034 | 0.1024 |
| 722 | 0.0971 | 0.103 | 0.103 | 0.1025 |
| 723 | 0.0974 | 0.1034 | 0.1034 | 0.1022 |
| 724 | 0.0958 | 0.1018 | 0.1041 | 0.1029 |
| 725 | 0.0969 | 0.1031 | 0.1035 | 0.1031 |
| 726 | 0.0966 | 0.1028 | 0.1042 | 0.1028 |
| 727 | 0.0966 | 0.1022 | 0.103 | 0.1022 |
| 728 | 0.0964 | 0.1013 | 0.1025 | 0.1024 |
| 729 | 0.0975 | 0.1025 | 0.1035 | 0.1025 |
| 730 | 0.097 | 0.1026 | 0.1031 | 0.1026 |
| 731 | 0.0956 | 0.102 | 0.1032 | 0.102 |
| 732 | 0.0956 | 0.1008 | 0.1041 | 0.1018 |
| 733 | 0.0962 | 0.1025 | 0.1037 | 0.1023 |
| 734 | 0.0965 | 0.103 | 0.1042 | 0.1018 |
| 735 | 0.0974 | 0.1023 | 0.1035 | 0.1018 |
| 736 | 0.0972 | 0.1021 | 0.1044 | 0.1032 |
| 737 | 0.0946 | 0.1007 | 0.1043 | 0.1006 |
| 738 | 0.0962 | 0.1027 | 0.1047 | 0.1015 |
| 739 | 0.0955 | 0.1028 | 0.1041 | 0.1023 |
| 740 | 0.0957 | 0.103 | 0.1052 | 0.103 |
| 741 | 0.0947 | 0.1021 | 0.1045 | 0.102 |
| 742 | 0.0957 | 0.1028 | 0.1047 | 0.1022 |
| 743 | 0.0957 | 0.1019 | 0.1043 | 0.1025 |
| 744 | 0.0956 | 0.1017 | 0.1049 | 0.1017 |
| 745 | 0.0943 | 0.1018 | 0.1043 | 0.1018 |
| 746 | 0.0946 | 0.1018 | 0.1058 | 0.1018 |
| 747 | 0.0955 | 0.1023 | 0.1061 | 0.1017 |
| 748 | 0.0963 | 0.1029 | 0.1054 | 0.1017 |
| 749 | 0.0966 | 0.1028 | 0.1054 | 0.1028 |
| 750 | 0.0963 | 0.1016 | 0.1057 | 0.1016 |
| 751 | 0.0946 | 0.1009 | 0.1054 | 0.1009 |
| 752 | 0.0958 | 0.1022 | 0.106 | 0.1022 |
| 753 | 0.0941 | 0.1017 | 0.1043 | 0.1017 |
| 754 | 0.0953 | 0.1017 | 0.1065 | 0.1017 |
| 755 | 0.0951 | 0.1009 | 0.1053 | 0.1015 |
| 756 | 0.0952 | 0.1012 | 0.1055 | 0.1016 |
| 757 | 0.0963 | 0.1027 | 0.1066 | 0.1027 |
| 758 | 0.0966 | 0.1022 | 0.107 | 0.1033 |
| 759 | 0.0959 | 0.1032 | 0.1068 | 0.1032 |
| 760 | 0.0955 | 0.102 | 0.1063 | 0.102 |
| 761 | 0.095 | 0.1015 | 0.1066 | 0.1027 |
| 762 | 0.0964 | 0.1016 | 0.1055 | 0.1029 |
| 763 | 0.0965 | 0.1018 | 0.1062 | 0.1031 |
| 764 | 0.0951 | 0.1019 | 0.1064 | 0.1032 |
| 765 | 0.0952 | 0.1009 | 0.107 | 0.1022 |
| 766 | 0.0943 | 0.1022 | 0.1062 | 0.1023 |

TABLE 1-continued

| wavelength (nm) | 0 degrees (%) | 90 degrees (%) | 180 degrees (%) | 270 degrees (%) |
|---|---|---|---|---|
| 767 | 0.0936 | 0.1015 | 0.1067 | 0.1037 |
| 768 | 0.0946 | 0.1018 | 0.1064 | 0.1031 |
| 769 | 0.0966 | 0.1021 | 0.1061 | 0.1035 |
| 770 | 0.096 | 0.1013 | 0.1052 | 0.1026 |
| 771 | 0.0971 | 0.1013 | 0.1063 | 0.1029 |
| 772 | 0.0955 | 0.1013 | 0.1058 | 0.1034 |
| 773 | 0.0948 | 0.1023 | 0.1067 | 0.1036 |
| 774 | 0.0937 | 0.1016 | 0.1068 | 0.103 |
| 775 | 0.095 | 0.1016 | 0.1067 | 0.1041 |
| 776 | 0.0958 | 0.1019 | 0.1063 | 0.1037 |
| 777 | 0.0958 | 0.1018 | 0.1063 | 0.1037 |
| 778 | 0.0964 | 0.1009 | 0.1059 | 0.1033 |
| 779 | 0.0939 | 0.1005 | 0.1057 | 0.1031 |
| 780 | 0.0962 | 0.1028 | 0.1067 | 0.1041 |
| 781 | 0.0947 | 0.1013 | 0.1059 | 0.1032 |
| 782 | 0.0959 | 0.1016 | 0.1059 | 0.1033 |
| 783 | 0.0967 | 0.102 | 0.1072 | 0.1046 |
| 784 | 0.0965 | 0.1016 | 0.1047 | 0.1043 |
| 785 | 0.0956 | 0.1001 | 0.1054 | 0.1033 |
| 786 | 0.0949 | 0.1002 | 0.1055 | 0.1033 |
| 787 | 0.0957 | 0.101 | 0.1064 | 0.1048 |
| 788 | 0.0961 | 0.1027 | 0.1056 | 0.1041 |
| 789 | 0.0964 | 0.1017 | 0.1066 | 0.1044 |
| 790 | 0.0974 | 0.102 | 0.106 | 0.1039 |
| 791 | 0.0972 | 0.1012 | 0.1063 | 0.1036 |
| 792 | 0.0972 | 0.1012 | 0.1053 | 0.1039 |
| 793 | 0.0961 | 0.1015 | 0.1069 | 0.1042 |
| 794 | 0.0951 | 0.1011 | 0.1059 | 0.1038 |
| 795 | 0.0949 | 0.1007 | 0.1057 | 0.1044 |
| 796 | 0.0968 | 0.101 | 0.1064 | 0.1051 |
| 797 | 0.0972 | 0.1002 | 0.1056 | 0.1041 |
| 798 | 0.0971 | 0.1012 | 0.1067 | 0.104 |
| 799 | 0.0975 | 0.1008 | 0.1063 | 0.1036 |
| 800 | 0.0962 | 0.1013 | 0.1057 | 0.1029 |
| 801 | 0.0963 | 0.1018 | 0.1074 | 0.1046 |
| 802 | 0.0969 | 0.1011 | 0.1063 | 0.1035 |
| 803 | 0.0968 | 0.101 | 0.1053 | 0.1032 |
| 804 | 0.0967 | 0.102 | 0.1053 | 0.1028 |
| 805 | 0.0973 | 0.1002 | 0.1059 | 0.1044 |
| 806 | 0.0979 | 0.1008 | 0.1065 | 0.1048 |
| 807 | 0.0973 | 0.1015 | 0.1066 | 0.1037 |
| 808 | 0.0963 | 0.1011 | 0.1065 | 0.1045 |
| 809 | 0.0982 | 0.1039 | 0.1084 | 0.107 |
| 810 | 0.0975 | 0.1017 | 0.1063 | 0.1034 |
| 811 | 0.0971 | 0.1011 | 0.1065 | 0.1041 |
| 812 | 0.0965 | 0.1008 | 0.107 | 0.1046 |
| 813 | 0.0977 | 0.1019 | 0.107 | 0.1052 |
| 814 | 0.0968 | 0.0999 | 0.1075 | 0.1045 |
| 815 | 0.0959 | 0.1009 | 0.1077 | 0.1061 |
| 816 | 0.0965 | 0.1018 | 0.1064 | 0.1049 |
| 817 | 0.0969 | 0.1016 | 0.1062 | 0.1046 |
| 818 | 0.0975 | 0.1006 | 0.1067 | 0.1037 |
| 819 | 0.0979 | 0.1026 | 0.11 | 0.1057 |
| 820 | 0.0971 | 0.1018 | 0.1087 | 0.1049 |
| 821 | 0.0959 | 0.1016 | 0.1085 | 0.1048 |
| 822 | 0.0964 | 0.1013 | 0.109 | 0.1059 |
| 823 | 0.0955 | 0.1017 | 0.108 | 0.1063 |
| 824 | 0.0975 | 0.1023 | 0.1087 | 0.1055 |
| 825 | 0.098 | 0.1028 | 0.1093 | 0.106 |
| 826 | 0.0986 | 0.1021 | 0.1086 | 0.1054 |
| 827 | 0.0959 | 0.1023 | 0.1089 | 0.1056 |
| 828 | 0.0972 | 0.1026 | 0.1103 | 0.1058 |
| 829 | 0.0954 | 0.102 | 0.1086 | 0.1053 |
| 830 | 0.0961 | 0.1015 | 0.1093 | 0.106 |
| 831 | 0.0966 | 0.1032 | 0.1099 | 0.1066 |
| 832 | 0.0988 | 0.1035 | 0.1105 | 0.1069 |
| 833 | 0.0986 | 0.1027 | 0.1104 | 0.1061 |
| 834 | 0.0982 | 0.1032 | 0.1111 | 0.1066 |
| 835 | 0.0972 | 0.1038 | 0.1123 | 0.1072 |
| 836 | 0.096 | 0.1027 | 0.1112 | 0.1061 |
| 837 | 0.0974 | 0.1032 | 0.1112 | 0.1066 |
| 838 | 0.0978 | 0.1037 | 0.1106 | 0.1071 |
| 839 | 0.099 | 0.1028 | 0.1097 | 0.1076 |
| 840 | 0.0977 | 0.1029 | 0.1099 | 0.1081 |
| 841 | 0.0977 | 0.1029 | 0.1117 | 0.1069 |
| 842 | 0.0969 | 0.1022 | 0.111 | 0.1066 |
| 843 | 0.0973 | 0.1026 | 0.1102 | 0.1062 |
| 844 | 0.0961 | 0.1031 | 0.1102 | 0.1067 |
| 845 | 0.0971 | 0.1039 | 0.1107 | 0.1086 |
| 846 | 0.1004 | 0.1057 | 0.1119 | 0.1083 |
| 847 | 0.0985 | 0.1039 | 0.1111 | 0.1075 |
| 848 | 0.1007 | 0.1045 | 0.1133 | 0.1097 |
| 849 | 0.0964 | 0.1051 | 0.1126 | 0.1088 |
| 850 | 0.0984 | 0.1045 | 0.113 | 0.1081 |
| 851 | 0.0988 | 0.1051 | 0.1124 | 0.1087 |
| 852 | 0.0977 | 0.1047 | 0.112 | 0.1069 |
| 853 | 0.0994 | 0.1032 | 0.1123 | 0.1086 |
| 854 | 0.0998 | 0.1048 | 0.1122 | 0.109 |
| 855 | 0.0992 | 0.1048 | 0.1122 | 0.1094 |
| 856 | 0.0973 | 0.1048 | 0.1136 | 0.1085 |
| 857 | 0.0989 | 0.1064 | 0.1122 | 0.1102 |
| 858 | 0.0978 | 0.1049 | 0.1121 | 0.109 |
| 859 | 0.0996 | 0.1052 | 0.1117 | 0.1101 |
| 860 | 0.0998 | 0.1055 | 0.1118 | 0.1105 |
| 861 | 0.1 | 0.1057 | 0.113 | 0.1097 |
| 862 | 0.1003 | 0.106 | 0.1119 | 0.1117 |
| 863 | 0.1006 | 0.1069 | 0.1145 | 0.1113 |
| 864 | 0.0998 | 0.1063 | 0.1139 | 0.1114 |
| 865 | 0.0991 | 0.1079 | 0.1125 | 0.111 |
| 866 | 0.1012 | 0.1087 | 0.1145 | 0.1126 |
| 867 | 0.1013 | 0.1056 | 0.1147 | 0.1109 |
| 868 | 0.1006 | 0.1073 | 0.114 | 0.1111 |
| 869 | 0.0998 | 0.1075 | 0.1132 | 0.1113 |
| 870 | 0.0982 | 0.1059 | 0.1135 | 0.1134 |
| 871 | 0.0986 | 0.1063 | 0.1137 | 0.1102 |
| 872 | 0.1003 | 0.108 | 0.1138 | 0.1119 |
| 873 | 0.1005 | 0.1082 | 0.114 | 0.1121 |
| 874 | 0.1006 | 0.1083 | 0.1141 | 0.1122 |
| 875 | 0.1024 | 0.1101 | 0.1159 | 0.114 |
| 876 | 0.1008 | 0.1092 | 0.115 | 0.1124 |
| 877 | 0.0999 | 0.1096 | 0.1165 | 0.1138 |
| 878 | 0.0992 | 0.109 | 0.1136 | 0.1132 |
| 879 | 0.1013 | 0.1109 | 0.1168 | 0.1149 |
| 880 | 0.1028 | 0.1086 | 0.1145 | 0.114 |
| 881 | 0.1024 | 0.1083 | 0.1141 | 0.1131 |
| 882 | 0.1034 | 0.1107 | 0.1165 | 0.1151 |
| 883 | 0.1035 | 0.1113 | 0.1172 | 0.1152 |
| 884 | 0.1013 | 0.1095 | 0.115 | 0.1134 |
| 885 | 0.0999 | 0.1089 | 0.1129 | 0.1129 |
| 886 | 0.1013 | 0.1091 | 0.1143 | 0.113 |
| 887 | 0.1021 | 0.1099 | 0.1158 | 0.1155 |
| 888 | 0.1022 | 0.11 | 0.114 | 0.114 |
| 889 | 0.1029 | 0.1108 | 0.1147 | 0.1147 |
| 890 | 0.1033 | 0.1123 | 0.1162 | 0.1162 |
| 891 | 0.1026 | 0.1125 | 0.1164 | 0.1164 |
| 892 | 0.1028 | 0.1127 | 0.1166 | 0.1166 |
| 893 | 0.1031 | 0.1115 | 0.1155 | 0.115 |
| 894 | 0.1032 | 0.1122 | 0.1162 | 0.1152 |
| 895 | 0.1062 | 0.1127 | 0.1167 | 0.1181 |
| 896 | 0.1038 | 0.1136 | 0.1175 | 0.1158 |
| 897 | 0.1036 | 0.1136 | 0.1192 | 0.1176 |
| 898 | 0.1021 | 0.1121 | 0.1161 | 0.1161 |
| 899 | 0.1023 | 0.1123 | 0.1176 | 0.1163 |
| 900 | 0.1043 | 0.1161 | 0.1169 | 0.1166 |
| 901 | 0.1066 | 0.1149 | 0.1169 | 0.1187 |
| 902 | 0.1057 | 0.1158 | 0.1184 | 0.1178 |
| 903 | 0.1062 | 0.1163 | 0.1203 | 0.1172 |
| 904 | 0.1041 | 0.1142 | 0.1183 | 0.1158 |
| 905 | 0.102 | 0.1142 | 0.1183 | 0.1163 |
| 906 | 0.1043 | 0.1156 | 0.1181 | 0.1176 |
| 907 | 0.1047 | 0.1149 | 0.118 | 0.1159 |
| 908 | 0.105 | 0.1159 | 0.1194 | 0.1159 |
| 909 | 0.1073 | 0.1176 | 0.1198 | 0.1156 |
| 910 | 0.1074 | 0.116 | 0.1202 | 0.1177 |
| 911 | 0.1062 | 0.1174 | 0.1207 | 0.1174 |
| 912 | 0.1053 | 0.1165 | 0.1213 | 0.1179 |
| 913 | 0.1068 | 0.1173 | 0.1218 | 0.1194 |
| 914 | 0.1057 | 0.1162 | 0.1205 | 0.1162 |
| 915 | 0.108 | 0.1179 | 0.1221 | 0.1186 |
| 916 | 0.1085 | 0.117 | 0.1213 | 0.118 |
| 917 | 0.1073 | 0.1175 | 0.1218 | 0.1175 |
| 918 | 0.1075 | 0.1161 | 0.1225 | 0.1161 |
| 919 | 0.1059 | 0.1189 | 0.1216 | 0.1157 |
| 920 | 0.1055 | 0.1175 | 0.1219 | 0.1175 |

TABLE 1-continued

| wavelength (nm) | 0 degrees (%) | 90 degrees (%) | 180 degrees (%) | 270 degrees (%) |
|---|---|---|---|---|
| 921 | 0.108 | 0.1174 | 0.1218 | 0.119 |
| 922 | 0.1099 | 0.1187 | 0.1231 | 0.1188 |
| 923 | 0.1105 | 0.1212 | 0.1238 | 0.1212 |
| 924 | 0.1093 | 0.1191 | 0.1235 | 0.1191 |
| 925 | 0.1073 | 0.1184 | 0.1229 | 0.1184 |
| 926 | 0.1078 | 0.121 | 0.1255 | 0.1191 |
| 927 | 0.1103 | 0.1218 | 0.1243 | 0.1198 |
| 928 | 0.1082 | 0.1203 | 0.1249 | 0.1211 |
| 929 | 0.1116 | 0.1208 | 0.1253 | 0.1218 |
| 930 | 0.1086 | 0.1178 | 0.1242 | 0.1178 |
| 931 | 0.1104 | 0.1197 | 0.1243 | 0.1197 |
| 932 | 0.1083 | 0.1204 | 0.1245 | 0.1199 |
| 933 | 0.1073 | 0.1212 | 0.1247 | 0.12 |
| 934 | 0.1064 | 0.1188 | 0.1269 | 0.1188 |
| 935 | 0.1089 | 0.123 | 0.1258 | 0.1207 |
| 936 | 0.1109 | 0.1229 | 0.1273 | 0.1221 |
| 937 | 0.1133 | 0.1254 | 0.1279 | 0.1235 |
| 938 | 0.1124 | 0.1231 | 0.1271 | 0.1225 |
| 939 | 0.1112 | 0.1232 | 0.1302 | 0.1228 |
| 940 | 0.1114 | 0.1243 | 0.1313 | 0.124 |
| 941 | 0.1074 | 0.1239 | 0.1264 | 0.1222 |
| 942 | 0.1105 | 0.1226 | 0.1264 | 0.1226 |
| 943 | 0.1103 | 0.1223 | 0.1273 | 0.1223 |
| 944 | 0.1132 | 0.1208 | 0.1259 | 0.1233 |
| 945 | 0.1128 | 0.1236 | 0.1312 | 0.1242 |
| 946 | 0.1099 | 0.1239 | 0.1291 | 0.124 |
| 947 | 0.1127 | 0.1245 | 0.1307 | 0.1256 |
| 948 | 0.1121 | 0.1225 | 0.1279 | 0.1227 |
| 949 | 0.1133 | 0.1259 | 0.1308 | 0.1259 |
| 950 | 0.1152 | 0.1268 | 0.1284 | 0.1257 |
| 951 | 0.1162 | 0.1262 | 0.1295 | 0.1252 |
| 952 | 0.1158 | 0.1262 | 0.1315 | 0.1262 |
| 953 | 0.1112 | 0.127 | 0.13 | 0.127 |
| 954 | 0.1138 | 0.1256 | 0.131 | 0.1264 |
| 955 | 0.1115 | 0.1253 | 0.1293 | 0.125 |
| 956 | 0.1112 | 0.1251 | 0.1278 | 0.1245 |
| 957 | 0.1203 | 0.1287 | 0.1316 | 0.1288 |
| 958 | 0.1158 | 0.125 | 0.13 | 0.1271 |
| 959 | 0.1156 | 0.127 | 0.1312 | 0.127 |
| 960 | 0.1154 | 0.127 | 0.1307 | 0.129 |
| 961 | 0.1138 | 0.1255 | 0.1284 | 0.1284 |
| 962 | 0.1146 | 0.1288 | 0.1318 | 0.1288 |
| 963 | 0.1157 | 0.1287 | 0.1317 | 0.1287 |
| 964 | 0.1149 | 0.1298 | 0.1328 | 0.1298 |
| 965 | 0.1176 | 0.1301 | 0.1331 | 0.1301 |
| 966 | 0.1136 | 0.1287 | 0.1317 | 0.1287 |
| 967 | 0.1184 | 0.1317 | 0.1358 | 0.1317 |
| 968 | 0.1154 | 0.1293 | 0.1355 | 0.131 |
| 969 | 0.1167 | 0.1293 | 0.1332 | 0.13 |
| 970 | 0.121 | 0.1338 | 0.1338 | 0.1338 |
| 971 | 0.1189 | 0.1318 | 0.1342 | 0.1318 |
| 972 | 0.1202 | 0.1317 | 0.1332 | 0.1332 |
| 973 | 0.1193 | 0.1292 | 0.1348 | 0.1325 |
| 974 | 0.1167 | 0.1298 | 0.1302 | 0.13 |
| 975 | 0.1151 | 0.1257 | 0.1314 | 0.1286 |
| 976 | 0.1192 | 0.1328 | 0.1328 | 0.1328 |
| 977 | 0.1206 | 0.1322 | 0.1322 | 0.1322 |
| 978 | 0.1191 | 0.1296 | 0.1326 | 0.1296 |
| 979 | 0.1229 | 0.1337 | 0.1373 | 0.1373 |
| 980 | 0.1168 | 0.1311 | 0.1347 | 0.1347 |
| 981 | 0.1159 | 0.1324 | 0.134 | 0.134 |
| 982 | 0.1176 | 0.1331 | 0.136 | 0.136 |
| 983 | 0.1191 | 0.1377 | 0.134 | 0.134 |
| 984 | 0.1207 | 0.134 | 0.1349 | 0.1369 |
| 985 | 0.124 | 0.1335 | 0.1355 | 0.1335 |
| 986 | 0.1196 | 0.1339 | 0.1339 | 0.1339 |
| 987 | 0.1215 | 0.1372 | 0.1372 | 0.1372 |
| 988 | 0.119 | 0.1316 | 0.135 | 0.135 |
| 989 | 0.119 | 0.1352 | 0.1368 | 0.1352 |
| 990 | 0.1232 | 0.1371 | 0.1387 | 0.1397 |
| 991 | 0.125 | 0.134 | 0.1375 | 0.1417 |
| 992 | 0.1226 | 0.1356 | 0.1392 | 0.1392 |
| 993 | 0.1245 | 0.1404 | 0.1374 | 0.1374 |
| 994 | 0.1195 | 0.1373 | 0.1373 | 0.1373 |
| 995 | 0.1222 | 0.1376 | 0.141 | 0.141 |
| 996 | 0.1174 | 0.1355 | 0.1355 | 0.1355 |
| 997 | 0.1228 | 0.1401 | 0.1366 | 0.1401 |
| 998 | 0.1214 | 0.1354 | 0.1354 | 0.1354 |
| 999 | 0.1232 | 0.1407 | 0.1374 | 0.1374 |
| 1000 | 0.1253 | 0.1356 | 0.1353 | 0.1397 |
| 1001 | 0.1211 | 0.1399 | 0.1366 | 0.1373 |
| 1002 | 0.1169 | 0.1319 | 0.1369 | 0.1399 |
| 1003 | 0.1192 | 0.1376 | 0.1396 | 0.1396 |
| 1004 | 0.1279 | 0.1443 | 0.1399 | 0.1443 |
| 1005 | 0.1261 | 0.1419 | 0.1463 | 0.1467 |
| 1006 | 0.1236 | 0.1397 | 0.136 | 0.1414 |
| 1007 | 0.1229 | 0.1393 | 0.1422 | 0.1418 |
| 1008 | 0.1228 | 0.1395 | 0.1408 | 0.1395 |
| 1009 | 0.1194 | 0.1422 | 0.1365 | 0.1422 |
| 1010 | 0.1219 | 0.1438 | 0.1393 | 0.1393 |
| 1011 | 0.1243 | 0.1393 | 0.1393 | 0.142 |
| 1012 | 0.1308 | 0.1428 | 0.1428 | 0.1447 |
| 1013 | 0.1294 | 0.1417 | 0.1417 | 0.1474 |
| 1014 | 0.1254 | 0.1442 | 0.1442 | 0.1442 |
| 1015 | 0.1257 | 0.1474 | 0.1474 | 0.1474 |
| 1016 | 0.1245 | 0.1427 | 0.1467 | 0.1427 |
| 1017 | 0.1274 | 0.1464 | 0.1475 | 0.1464 |
| 1018 | 0.1175 | 0.1439 | 0.1371 | 0.1439 |
| 1019 | 0.1326 | 0.1466 | 0.1374 | 0.1444 |
| 1020 | 0.1318 | 0.1422 | 0.1356 | 0.1427 |
| 1021 | 0.1367 | 0.1496 | 0.144 | 0.1513 |
| 1022 | 0.1266 | 0.1415 | 0.1489 | 0.1489 |
| 1023 | 0.128 | 0.145 | 0.145 | 0.1467 |
| 1024 | 0.1254 | 0.1453 | 0.1453 | 0.1495 |
| 1025 | 0.1335 | 0.155 | 0.1495 | 0.1495 |
| 1026 | 0.1312 | 0.1482 | 0.1475 | 0.1475 |
| 1027 | 0.1338 | 0.1505 | 0.1421 | 0.1505 |
| 1028 | 0.1337 | 0.1509 | 0.1456 | 0.1509 |
| 1029 | 0.1264 | 0.1494 | 0.1494 | 0.1548 |
| 1030 | 0.1261 | 0.1456 | 0.138 | 0.147 |
| 1031 | 0.1203 | 0.1481 | 0.1474 | 0.1481 |
| 1032 | 0.1259 | 0.1514 | 0.142 | 0.1486 |
| 1033 | 0.1354 | 0.1548 | 0.1451 | 0.1451 |
| 1034 | 0.1382 | 0.1504 | 0.1481 | 0.1557 |
| 1035 | 0.1419 | 0.152 | 0.152 | 0.1521 |
| 1036 | 0.1253 | 0.1462 | 0.1462 | 0.1542 |
| 1037 | 0.1334 | 0.1499 | 0.1499 | 0.1548 |
| 1038 | 0.1278 | 0.1463 | 0.1539 | 0.1498 |
| 1039 | 0.1245 | 0.1472 | 0.1481 | 0.1472 |
| 1040 | 0.147 | 0.1603 | 0.1586 | 0.1603 |
| 1041 | 0.135 | 0.1543 | 0.1424 | 0.1543 |
| 1042 | 0.131 | 0.1579 | 0.1458 | 0.1505 |
| 1043 | 0.1255 | 0.1526 | 0.1506 | 0.1611 |
| 1044 | 0.1277 | 0.1534 | 0.1543 | 0.1424 |
| 1045 | 0.1234 | 0.146 | 0.1553 | 0.1513 |
| 1046 | 0.1436 | 0.1573 | 0.15 | 0.1509 |
| 1047 | 0.154 | 0.1573 | 0.154 | 0.168 |
| 1048 | 0.1291 | 0.1433 | 0.1433 | 0.1434 |
| 1049 | 0.1291 | 0.1586 | 0.1471 | 0.1471 |
| 1050 | 0.1281 | 0.1516 | 0.1585 | 0.1585 |

According to the 1st example, the reflectivity of the low-reflection layer 120 at the wavelength of 380 nm is in a range of 0.1365% to 0.1649%, the reflectivity of the low-reflection layer 120 at the wavelength of 400 nm is in a range of 0.1344% to 0.1458%, the reflectivity of the low-reflection layer 120 at the wavelength of 680 nm is in a range of 0.1005% to 0.1071%, the reflectivity of the low-reflection layer 120 at the wavelength of 800 nm is in a range of 0.0962% to 0.1057%, and the reflectivity of the low-reflection layer 120 at the wavelength of 1000 nm is in a range of 0.1253% to 0.1397%. Therefore, it is favorable for decreasing the problem of the reddish coating and enhancing the image quality, but the aforementioned reflectivity is not limited thereto.

2ND EXAMPLE

Figure 2A:
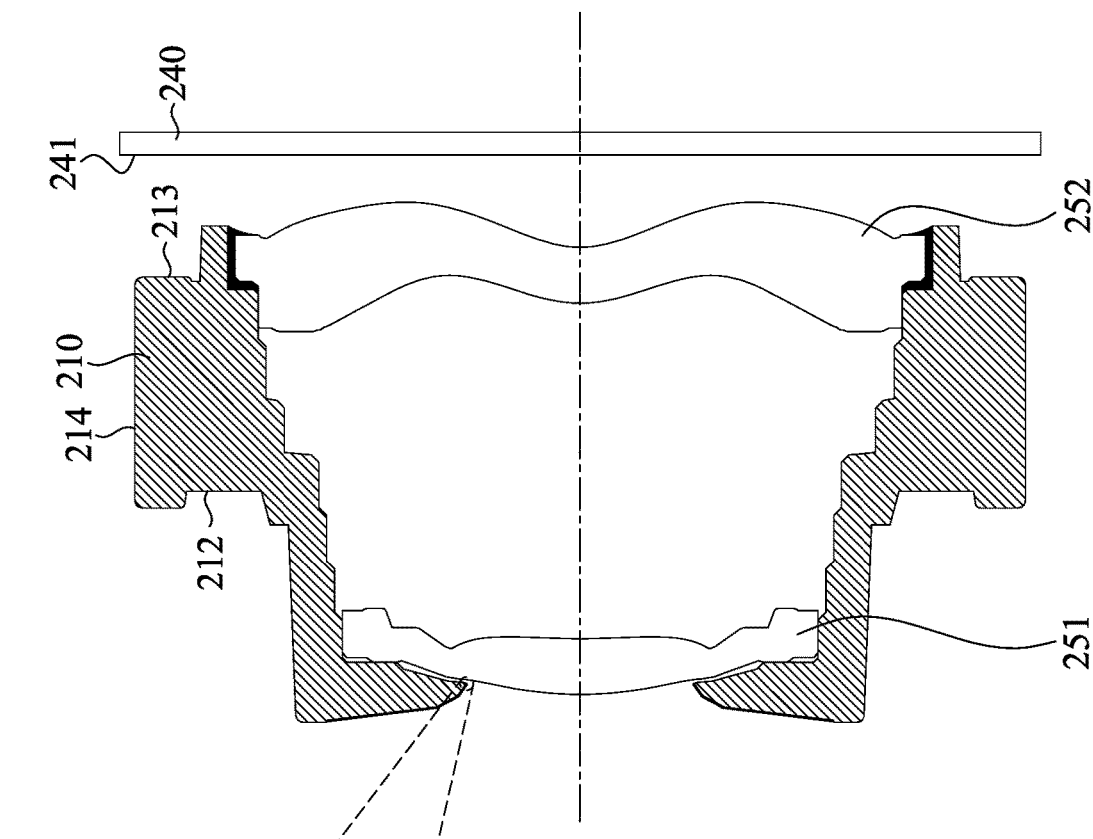
FIG. 2A is a schematic view of an electronic device according to the 2nd example of the present disclosure.
Figure 2A:
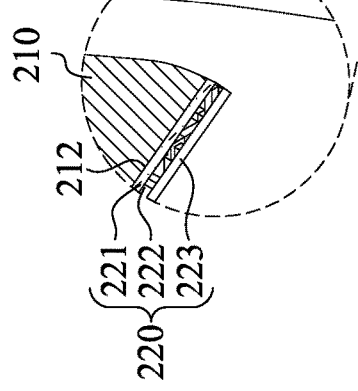

FIG. 2A is a schematic view of an electronic device 20 according to the 2nd example of the present disclosure. FIG.

Figure 2B:
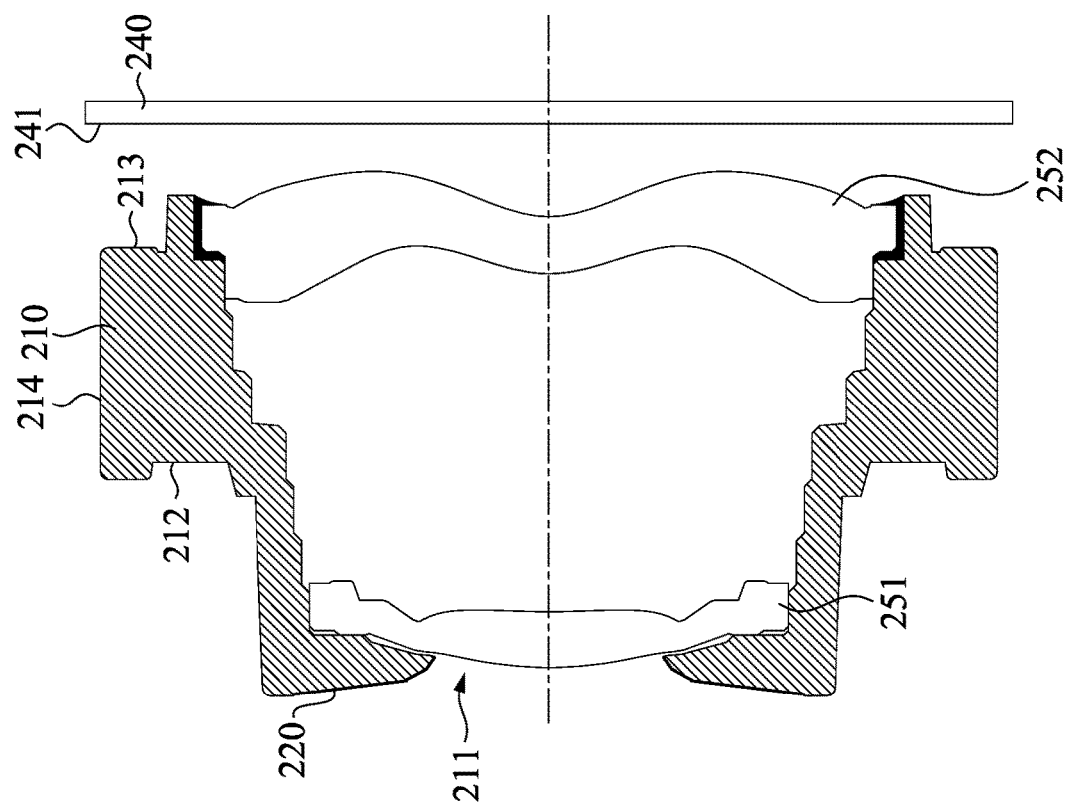
FIG. 2B is another schematic view of the electronic device according to the 2nd example in FIG. 2A.

2B is another schematic view of the electronic device 20 according to the 2nd example in FIG. 2A. In FIGS. 2A and 2B, the electronic device 20 includes a camera module (its reference numeral is omitted) and an image sensor 240, wherein the camera module includes an imaging lens assembly (its reference numeral is omitted), and the image sensor 240 is disposed on an image surface 241 of the camera module.

The imaging lens assembly includes a first optical element 210 and a low-reflection layer 220. The first optical element 210 has a central opening 211, and includes a first surface 212, a second surface 213 and a first outer diameter surface 214. The low-reflection layer 220 is located on at least one of the first surface 212 and the second surface 213, and includes a carbon black layer 221, a nano-microstructure 222 and a coating layer 223. According to the 2nd example, the low-reflection layer 220 is located on the first surface 212, but is not limited thereto.

In particular, the first optical element 210 can be a plastic product such as a lens barrel, a spacer, a retainer, a light blocking element or a light blocking sheet, and so on, but is not limited thereto. According to the 2nd example, the first optical element 210 is the lens barrel, but is not limited thereto. In detail, the imaging lens assembly includes at least one optical element. According to the 2nd example, the imaging lens assembly includes optical lens elements 251, 252, and the first optical element 210 is for accommodating the optical lens elements 251, 252, wherein the optical elements can be disposed according to different imaging demands, such as the numbers, the structures, the surface shapes, and so on, and is not limited thereto.

Figure 2C:
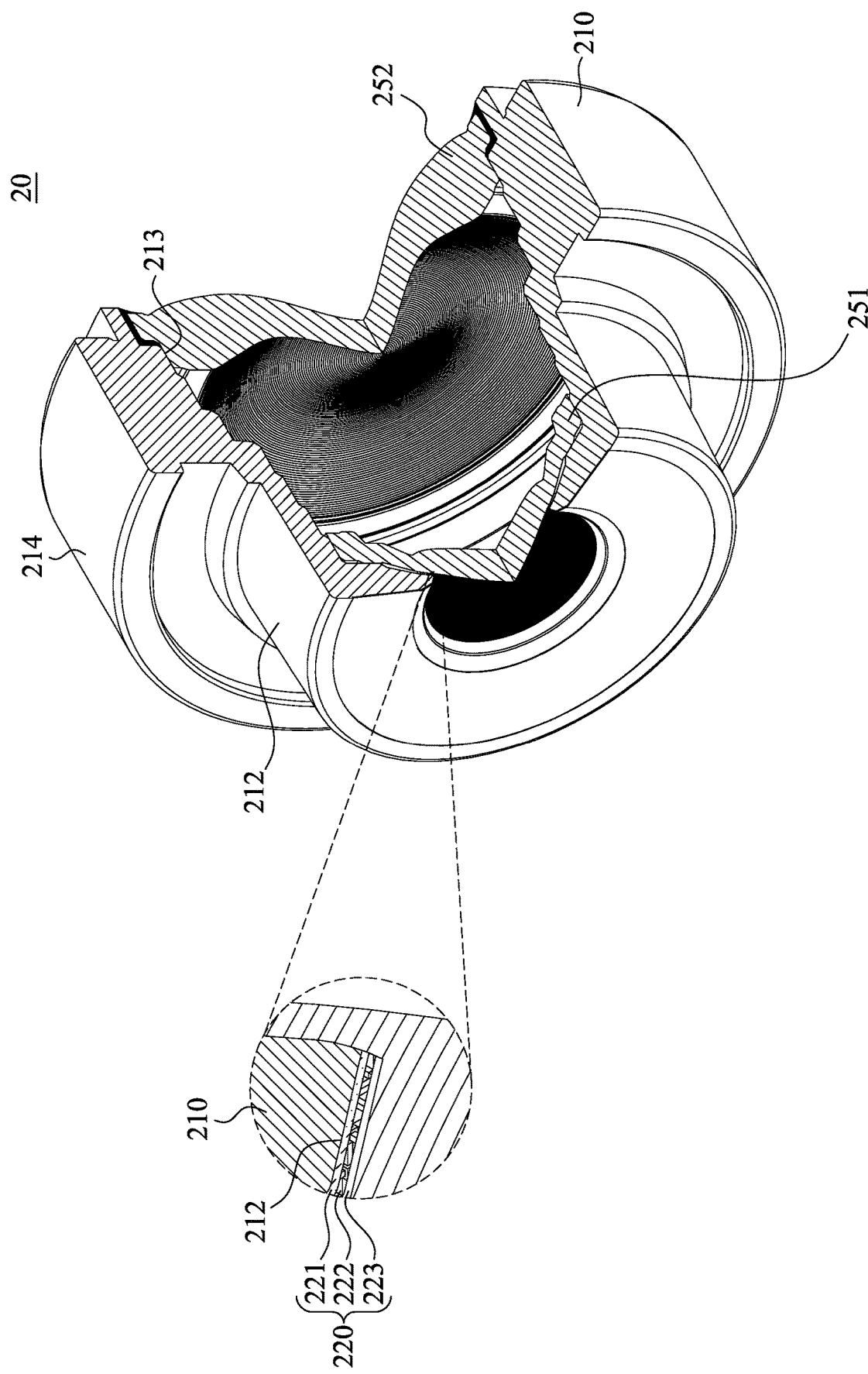
FIG. 2C is a partially cross-sectional view of the electronic device according to the 2nd example in FIG. 2A.
Figure 2D:
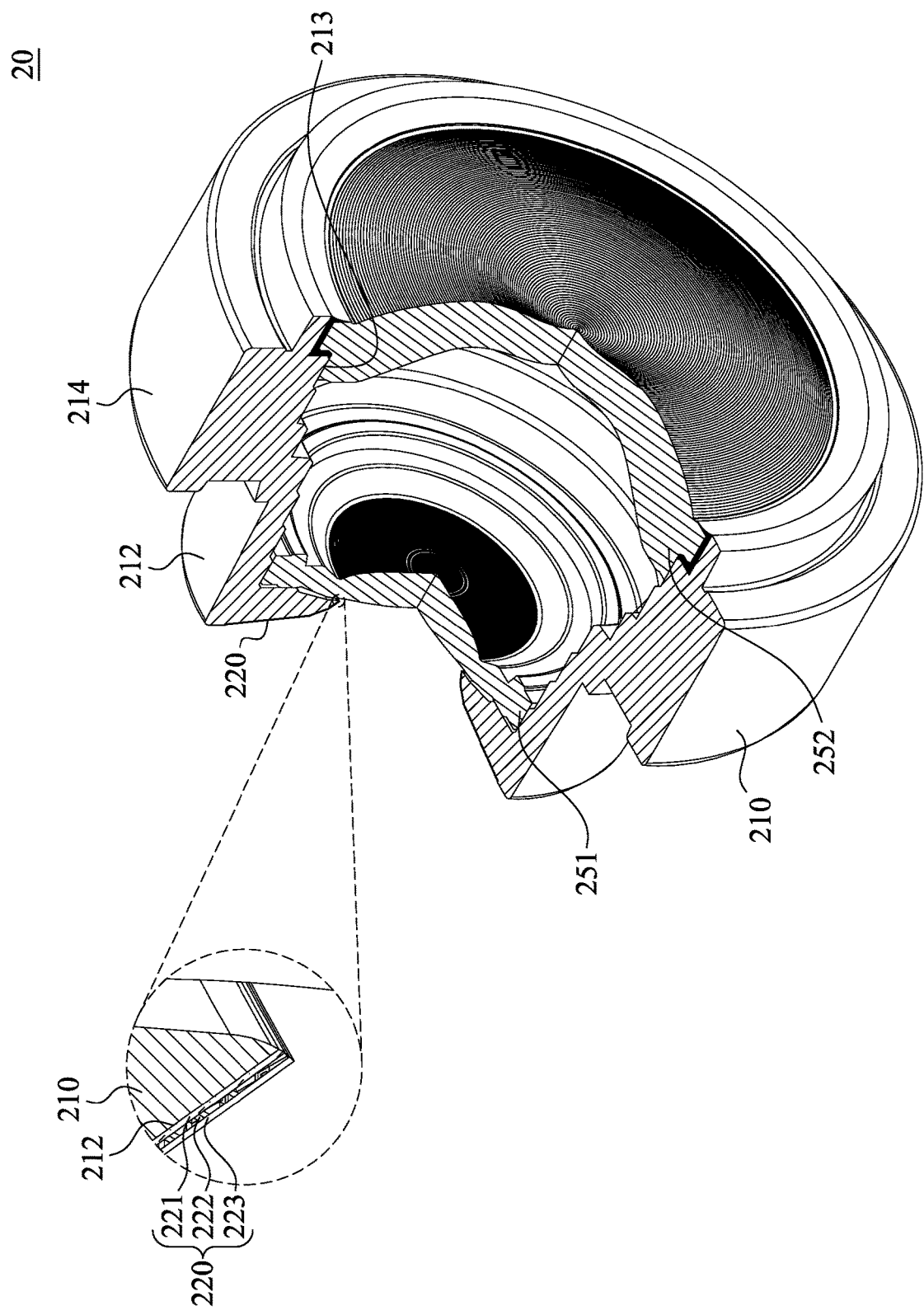
FIG. 2D is another partially cross-sectional view of the electronic device according to the 2nd example in FIG. 2A.

FIG. 2C is a partially cross-sectional view of the electronic device 20 according to the 2nd example in FIG. 2A. FIG. 2D is another partially cross-sectional view of the electronic device 20 according to the 2nd example in FIG. 2A. In FIGS. 2A to 2D, the first surface 212 faces towards one side of an object side and an image side of the imaging lens assembly and surrounds the central opening 211. The second surface 213 faces towards the other side of the object side and the image side of the imaging lens assembly and surrounds the central opening 211. The first outer diameter surface 214 is connected to the first surface 212 and the second surface 213. According to the 2nd example, the first surface 212 faces towards the object side of the imaging lens assembly, and the second surface 213 faces towards the image side of the imaging lens assembly, but is not limited thereto. In particular, a gap does not exist between the first surface 212 and a surface of the first optical element 210 and between the second surface 213 and the surface of the first optical element 210.

In FIGS. 2A to 2D, an appearance of the carbon black layer 221 is black, and is directly contacted with and connected to the at least one of the first surface 212 and the second surface 213. According to the 2nd example, the carbon black layer 221 is directly contacted with and connected to the first surface 212, but is not limited thereto. The nano-microstructure 222 is a porous structure form, and is directly contacted with and connected to the carbon black layer 221. The nano-microstructure 222 is farther from the first optical element 210 than the carbon black layer 221 from the first optical element 210. The coating layer 223 is directly contacted with and connected to the nano-microstructure 222, and the coating layer 223 is farther from the first optical element 210 than the nano-microstructure 222 from the first optical element 210.

Moreover, the carbon black layer 221 is disposed on the first surface 212 of the first optical element 210 via a spray process. The nano-microstructure 222 is formed by the carbon black layer 221 treated via a special treatment. Hence, a composition of the nano-microstructure 222 is the same as a composition of the carbon black layer 221. In particular, the special treatment can be a surface roughening process of the carbon black layer 221, and then the nuclear reaction is performed on a surface of the carbon black layer 221 with a proper material, such as the physical vapor deposition, the chemical vapor deposition, the vacuum evaporation, the sputtering, the ion plating, and so on. That is, the surface roughening process can be regarded as the crystallization process. A surface structure with a nano-crystallization is formed via the crystallization process, and the surface structure of the nano-crystallization is the nano-microstructure 222. After forming the nano-microstructure 222, the coating layer 223 is disposed on an external of the nano-microstructure 222 to protect a nanostructure thereof. Therefore, it is favorable for strengthening the durability and the structural stability of the low-reflection layer 220. The carbon black layer 221 is directly contacted with and connected to the nano-microstructure 222, and the nano-microstructure 222 is directly contacted with and connected to the coating layer 223. Also, the gap does not exist between the carbon black layer 221 and the nano-microstructure 222 and between the nano-microstructure 222 and the coating layer 223.

In detail, a reflection intensity of the stray light is weakened by the extremely low reflectivity of the low-reflection layer 220 to further enhance the image quality. Further, different from techniques of prior art such as the inking process, the blasting process and the coating process, the insufficiency of the structural support of the low-reflection layer 220 is improved by the low-reflection layer 220. The coating layer 223 can be a single-layer film. Although the better anti-reflection effect can be obtained via a multi-layer film of prior art, a process of prior art is more complicated and high-cost, and the aforementioned problem can be improved by the present disclosure. By a choice of a material of the coating layer 223, surface characteristics of the low-reflection layer 220 can be further changed, for example, the anti-oxidation ability can be enhanced; the light intensity of the light reflecting from a surface can be decreased, and so on.

The coating layer 223 can be made of a metal oxide, and the metal oxide can be a titanic oxide, an aluminum oxide, a metal nitride, a metal fluoride and so on. According to the 2nd example, the coating layer 223 is made of the aluminum oxide, and a refractive index of the aluminum oxide is 1.56. Therefore, a surface hardness and an abrasion resistance of the low-reflection layer 220 can be further enhanced. Also, by a characteristic of the refractive index of different materials of the coating layer 223, a graded index can be obtained between the low-reflection layer 220 and an air to lower the light intensity of the light reflecting from the surface of the low-reflection layer 220.

In detail, a grain pitch of the nano-microstructure 222 is GP, and the grain pitch GP of the nano-microstructure 222 is a minimum distance between peaks of each of grains. According to the 2nd example, the grain pitch GP of the nano-microstructure 222 is 55 nm.

3RD EXAMPLE

Figure 3A:
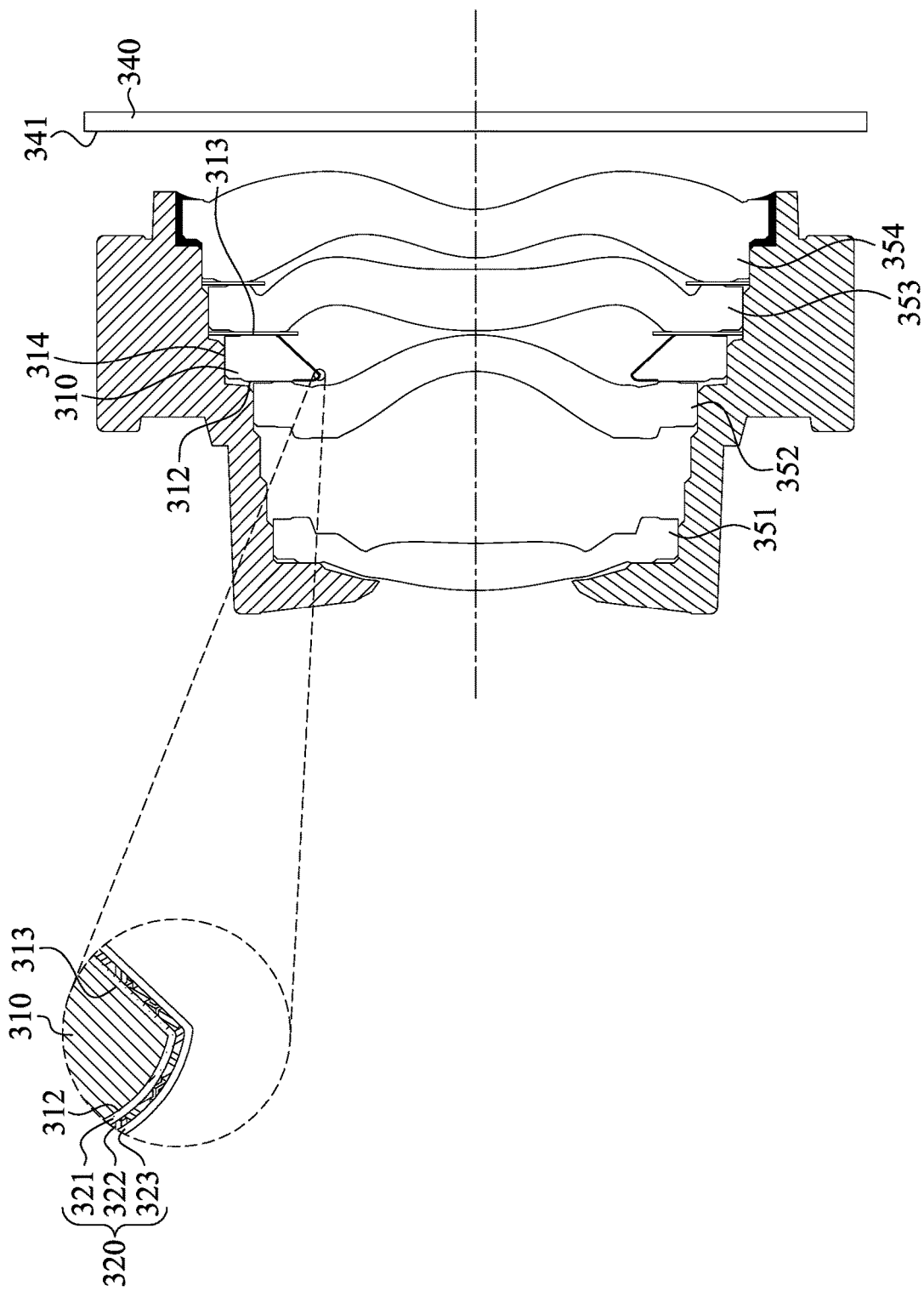
FIG. 3A is a schematic view of an electronic device according to the 3rd example of the present disclosure.
Figure 3B:
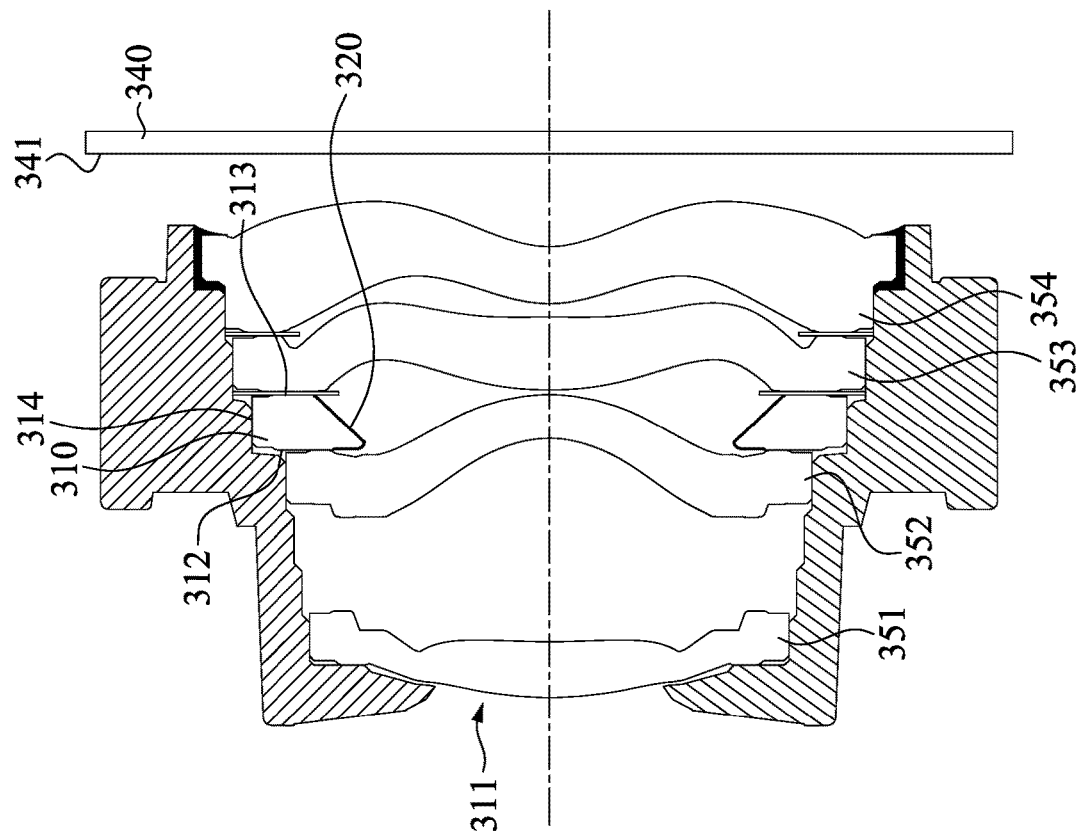
FIG. 3B is another schematic view of the electronic device according to the 3rd example in FIG. 3A.

FIG. 3A is a schematic view of an electronic device 30 according to the 3rd example of the present disclosure. FIG. 3B is another schematic view of the electronic device 30 according to the 3rd example in FIG. 3A. In FIGS. 3A and 3B, the electronic device 30 includes a camera module (its reference numeral is omitted) and an image sensor 340, wherein the camera module includes an imaging lens assembly (its reference numeral is omitted), and the image sensor 340 is disposed on an image surface 341 of the camera module.

The imaging lens assembly includes a first optical element 310 and a low-reflection layer 320. The first optical element 310 has a central opening 311, and includes a first surface 312, a second surface 313 and a first outer diameter surface 314. The low-reflection layer 320 is located on at least one of the first surface 312 and the second surface 313, and includes a carbon black layer 321, a nano-microstructure 322 and a coating layer 323. According to the 3rd example, the low-reflection layer 320 is located on both of the first surface 312 and the second surface 313, but is not limited thereto.

In particular, the first optical element 310 can be a plastic product such as a lens barrel, a spacer, a retainer, a light blocking element or a light blocking sheet, and so on, but is not limited thereto. According to the 3rd example, the first optical element 310 is the spacer, but is not limited thereto. In detail, the imaging lens assembly includes at least one optical element. According to the 3rd example, the imaging lens assembly includes optical lens elements 351, 352, 353, 354, the first optical element 310 is disposed between the optical lens elements 352, 353, and the first optical element 310 and the optical lens elements 351, 352, 353, 354 are disposed in the lens barrel (its reference numeral is omitted), wherein the optical elements can be disposed according to different imaging demands, such as the numbers, the structures, the surface shapes, and so on, and is not limited thereto.

Figure 3C:
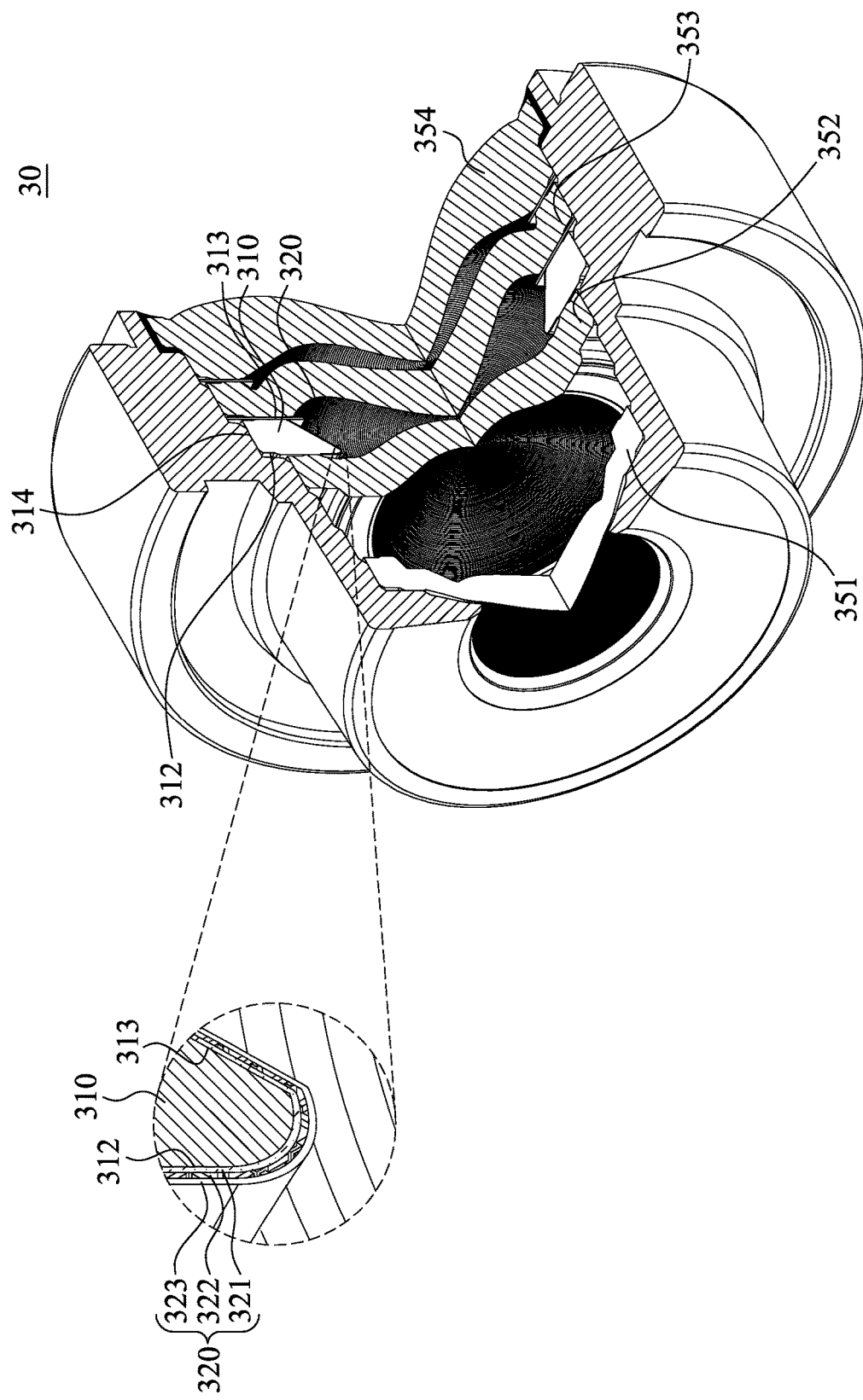
FIG. 3C is a partially cross-sectional view of the electronic device according to the 3rd example in FIG. 3A.
Figure 3D:
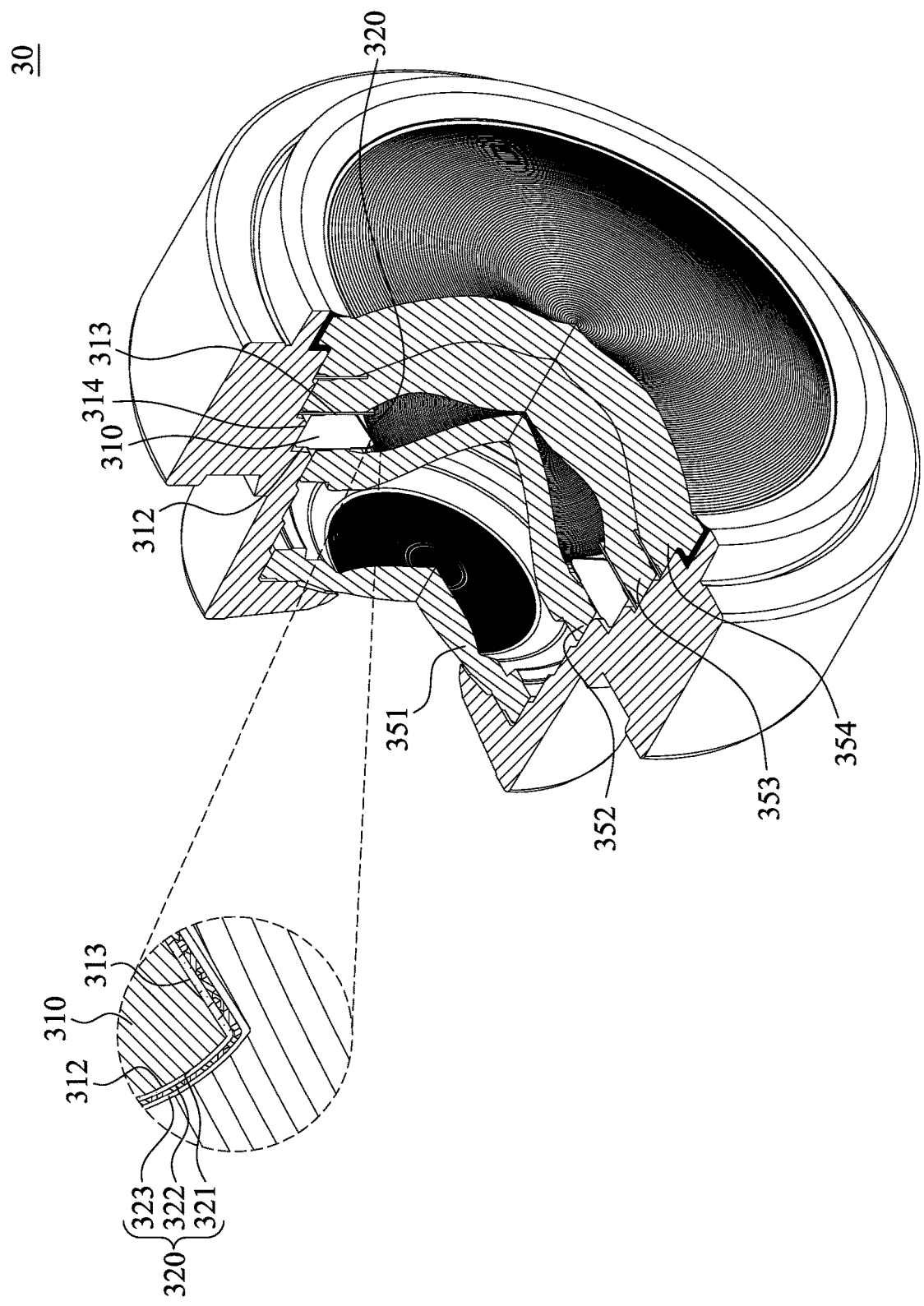
FIG. 3D is another partially cross-sectional view of the electronic device according to the 3rd example in FIG. 3A.

FIG. 3C is a partially cross-sectional view of the electronic device 30 according to the 3rd example in FIG. 3A. FIG. 3D is another partially cross-sectional view of the electronic device 30 according to the 3rd example in FIG. 3A. In FIGS. 3A to 3D, the first surface 312 faces towards one side of an object side and an image side of the imaging lens assembly and surrounds the central opening 311. The second surface 313 faces towards the other side of the object side and the image side of the imaging lens assembly and surrounds the central opening 311. The first outer diameter surface 314 is connected to the first surface 312 and the second surface 313. According to the 3rd example, the first surface 312 faces towards the object side of the imaging lens assembly, and the second surface 313 faces towards the image side of the imaging lens assembly, but is not limited thereto. In particular, a gap does not exist between the first surface 312 and a surface of the first optical element 310 and between the second surface 313 and the surface of the first optical element 310.

In FIGS. 3A to 3D, an appearance of the carbon black layer 321 is black, and is directly contacted with and connected to the at least one of the first surface 312 and the second surface 313. According to the 3rd example, the carbon black layer 321 is directly contacted with and connected to the first surface 312 and the second surface 313, but is not limited thereto. The nano-microstructure 322 is a porous structure form, and is directly contacted with and connected to the carbon black layer 321. The nano-microstructure 322 is farther from the first optical element 310 than the carbon black layer 321 from the first optical element 310. The coating layer 323 is directly contacted with and connected to the nano-microstructure 322, and the coating layer 323 is farther from the first optical element 310 than the nano-microstructure 322 from the first optical element 310.

Moreover, according to the 3rd example, the low-reflection layer 320 is in a full-circle form. The carbon black layer 321 is disposed on the first surface 312 and the second surface 313 of the first optical element 310 via a spray process. The nano-microstructure 322 is formed by the carbon black layer 321 treated via a special treatment. Hence, a composition of the nano-microstructure 322 is the same as a composition of the carbon black layer 321. In particular, the special treatment can be a surface roughening process of the carbon black layer 321, and then the nuclear reaction is performed on a surface of the carbon black layer 321 with a proper material, such as the physical vapor deposition, the chemical vapor deposition, the vacuum evaporation, the sputtering, the ion plating, and so on. That is, the surface roughening process can be regarded as the crystallization process. A surface structure with a nano-crystallization is formed via the crystallization process, and the surface structure of the nano-crystallization is the nano-microstructure 322. After forming the nano-microstructure 322, the coating layer 323 is disposed on an external of the nano-microstructure 322 to protect a nanostructure thereof. Therefore, it is favorable for strengthening the durability and the structural stability of the low-reflection layer 320. The carbon black layer 321 is directly contacted with and connected to the nano-microstructure 322, and the nano-microstructure 322 is directly contacted with and connected to the coating layer 323. Also, the gap does not exist between the carbon black layer 321 and the nano-microstructure 322 and between the nano-microstructure 322 and the coating layer 323.

In detail, a reflection intensity of the stray light is weakened by the extremely low reflectivity of the low-reflection layer 320 to further enhance the image quality. Further, different from techniques of prior art such as the inking process, the blasting process and the coating process, the insufficiency of the structural support of the low-reflection layer 320 is improved by the low-reflection layer 320. The coating layer 323 can be a single-layer film. Although the better anti-reflection effect can be obtained via a multi-layer film of prior art, a process of prior art is more complicated and high-cost, and the aforementioned problem can be improved by the present disclosure. By a choice of a material of the coating layer 323, surface characteristics of the low-reflection layer 320 can be further changed, for example, the anti-oxidation ability can be enhanced; the light intensity of the light reflecting from a surface can be decreased, and so on.

The coating layer 323 can be made of a silicon oxide. When the coating layer 323 is made of the silicon oxide, it is favorable for enhancing the anti-oxidation ability of the low-reflection layer 320. According to the 3rd example, a refractive index of the coating layer 323 is 1.46. Therefore, it is favorable for preventing the oxidation of the nano-microstructure 322 and the oxidation of the carbon black layer 321 to promote the durability of the low-reflection layer 320.

In detail, a grain pitch of the nano-microstructure 322 is GP, and the grain pitch GP of the nano-microstructure 322 is a minimum distance between peaks of each of grains. According to the 3rd example, the grain pitch GP of the nano-microstructure 322 is 63 nm.

4TH EXAMPLE

Figure 4A:
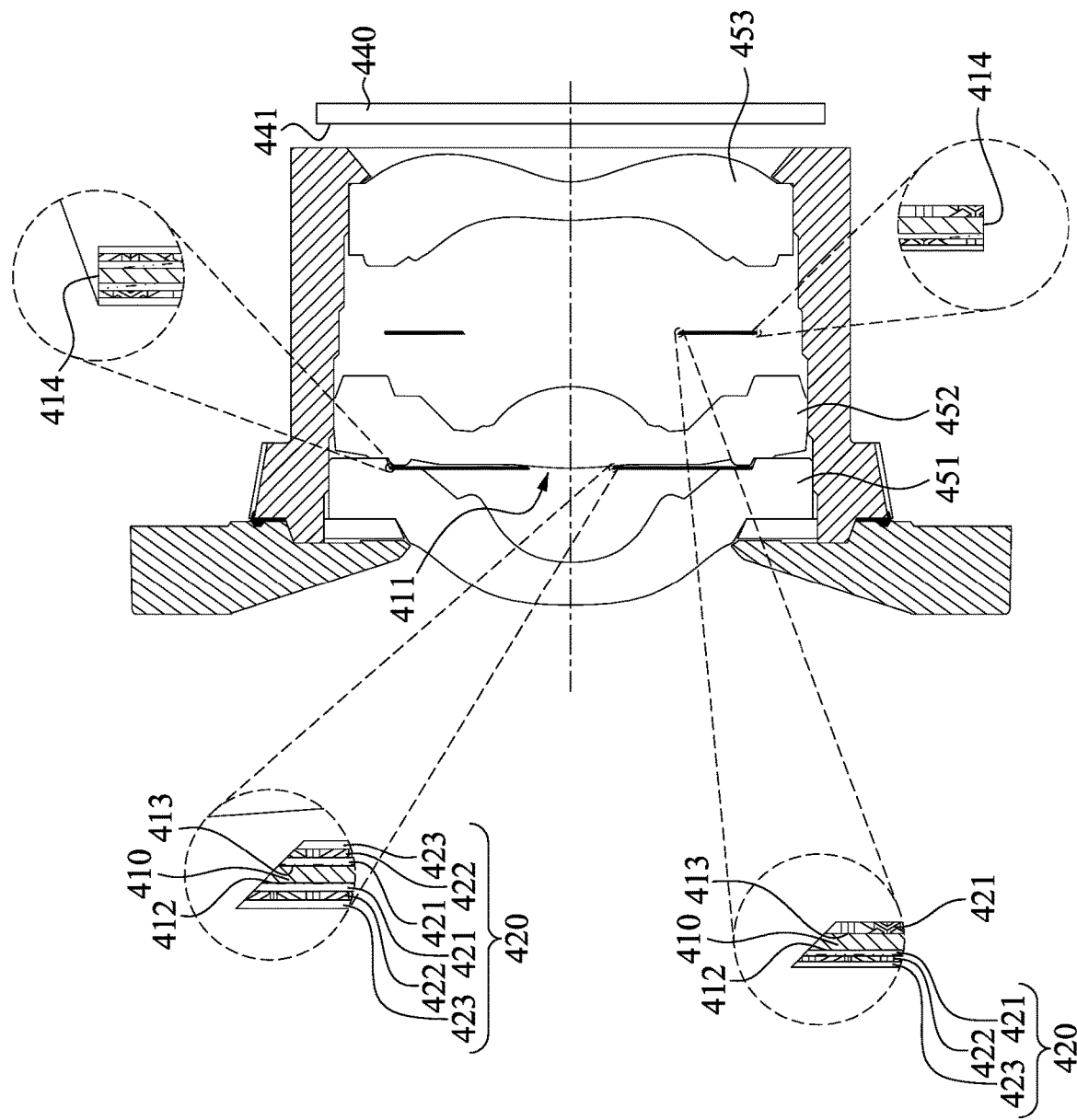
FIG. 4A is a schematic view of an electronic device according to the 4th example of the present disclosure.

FIG. 4A is a schematic view of an electronic device 40 according to the 4th example of the present disclosure. FIG.

4B is another schematic view of the electronic device 40 according to the 4th example in FIG. 4A. In FIGS. 4A and 4B, the electronic device 40 includes a camera module (its reference numeral is omitted) and an image sensor 440, wherein the camera module includes an imaging lens assembly (its reference numeral is omitted), and the image sensor 440 is disposed on an image surface 441 of the camera module.

The imaging lens assembly includes two first optical elements 410 and a low-reflection layer 420. Each of the first optical elements 410 has a central opening 411, and includes a first surface 412, a second surface 413 and a first outer diameter surface 414. The low-reflection layer 420 is located on at least one of the first surface 412 and the second surface 413, and includes a carbon black layer 421, a nano-microstructure 422 and a coating layer 423. According to the 4th example, the low-reflection layer 420 is located on both of the first surface 412 and the second surface 413. In detail, in the first optical element 410 close to an image side of the imaging lens assembly, the low-reflection layer 420 located on the second surface 413 only includes the carbon black layer 421, but is not limited thereto.

In particular, each of the first optical elements 410 can be a plastic product such as a lens barrel, a spacer, a retainer, a light blocking element or a light blocking sheet, and so on, but is not limited thereto. According to the 4th example, both of the first optical elements 410 are the light blocking sheets, but are not limited thereto. In detail, the imaging lens assembly includes at least one optical element. According to the 4th example, the imaging lens assembly includes optical lens elements 451, 452, 453, each of the first optical elements 410 is disposed between the optical lens elements 451, 452 and between the optical lens elements 452, 453, and the first optical elements 410 and the optical lens elements 451, 452, 453 are disposed in the lens barrel (its reference numeral is omitted), wherein the optical elements can be disposed according to different imaging demands, such as the numbers, the structures, the surface shapes, and so on, and is not limited thereto.

Figure 4C:
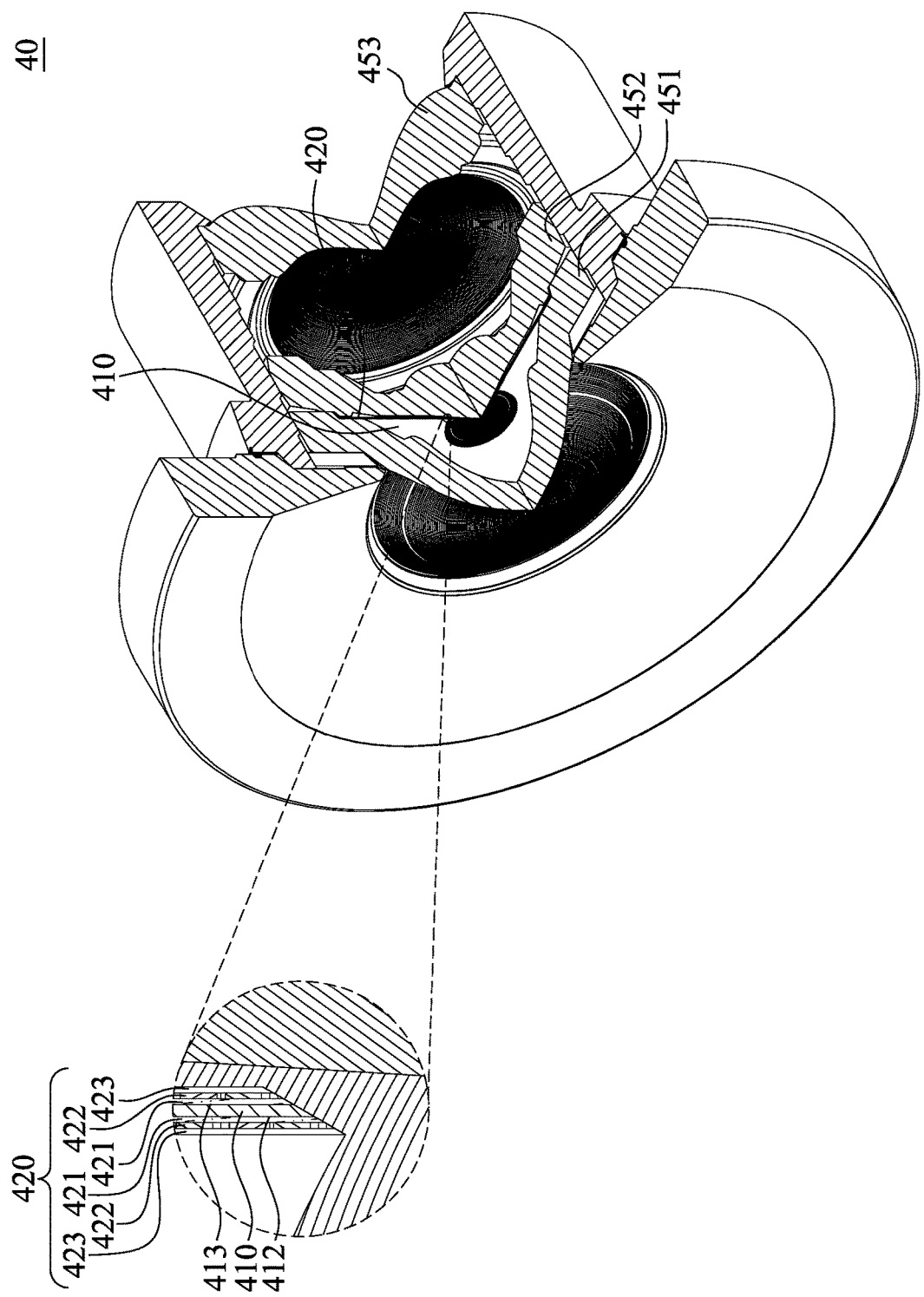
FIG. 4C is a partially cross-sectional view of the electronic device according to the 4th example in FIG. 4A.
Figure 4D:
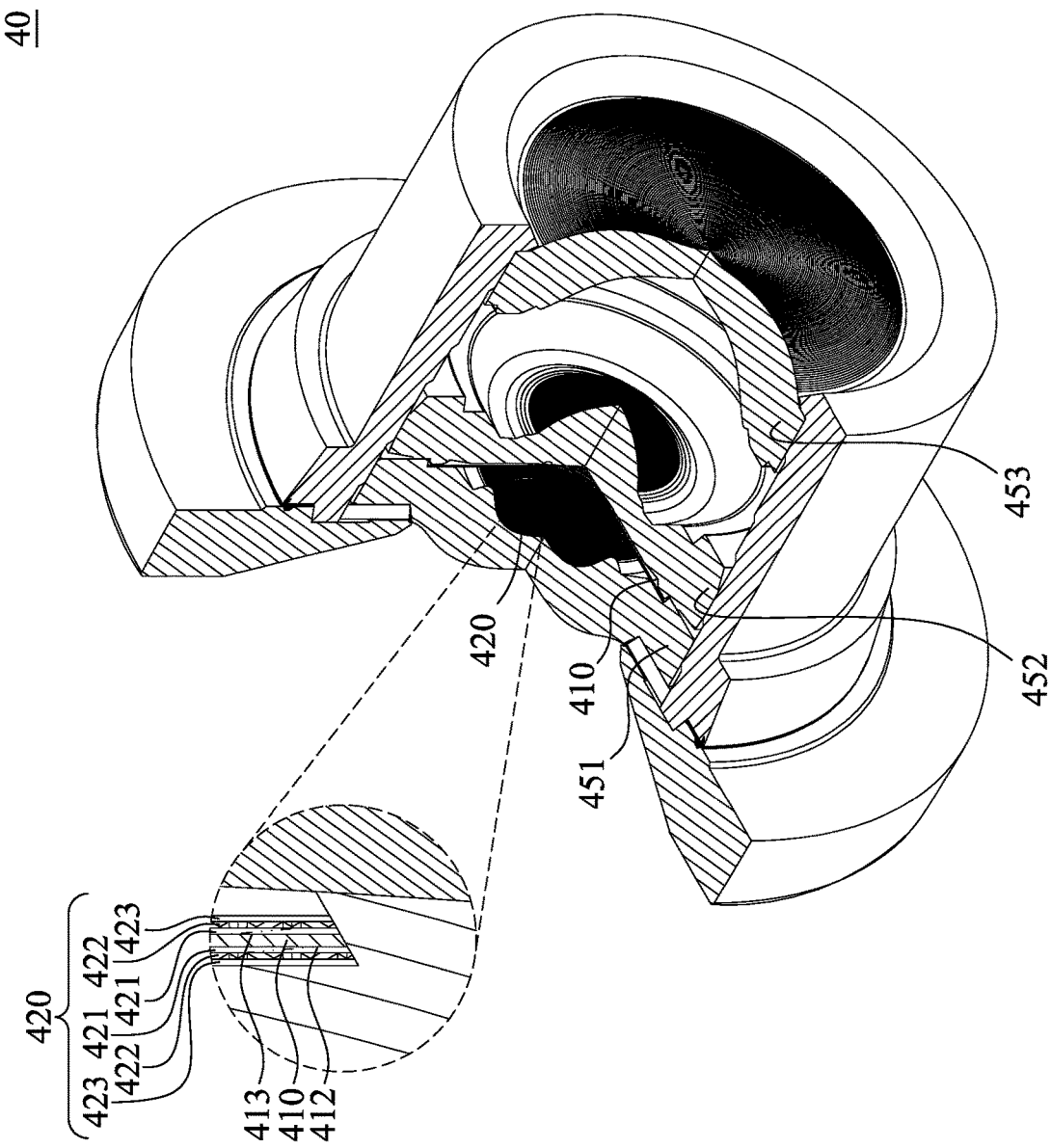
FIG. 4D is another partially cross-sectional view of the electronic device according to the 4th example in FIG. 4A.

FIG. 4C is a partially cross-sectional view of the electronic device 40 according to the 4th example in FIG. 4A. FIG. 4D is another partially cross-sectional view of the electronic device 40 according to the 4th example in FIG. 4A. In FIGS. 4A to 4D, the first surface 412 faces towards one side of an object side and the image side of the imaging lens assembly and surrounds the central opening 411. The second surface 413 faces towards the other side of the object side and the image side of the imaging lens assembly and surrounds the central opening 411. The first outer diameter surface 414 is connected to the first surface 412 and the second surface 413. According to the 4th example, the first surface 412 faces towards the object side of the imaging lens assembly, and the second surface 413 faces towards the image side of the imaging lens assembly, but is not limited thereto. In particular, a gap does not exist between the first surfaces 412 and a surface of the first optical elements 410 and between the second surfaces 413 and the surface of the first optical elements 410.

In FIGS. 4A to 4D, an appearance of the carbon black layer 421 is black, and is directly contacted with and connected to the at least one of the first surface 412 and the second surface 413. According to the 4th example, the carbon black layer 421 is directly contacted with and connected to the first surface 412 and the second surface 413, but is not limited thereto. The nano-microstructure 422 is a porous structure form, and is directly contacted with and connected to the carbon black layer 421. The nano-microstructure 422 is farther from the first optical elements 410 than the carbon black layer 421 from the first optical elements 410. The coating layer 423 is directly contacted with and connected to the nano-microstructure 422, and the coating layer 423 is farther from the first optical elements 410 than the nano-microstructure 422 from the first optical elements 410.

Moreover, according to the 4th example, the low-reflection layer 420 is a layered structure, and the nano-microstructure 422 of the low-reflection layer 420 can be for absorbing the non-imaging stray light. The carbon black layer 421 is disposed on the first surfaces 412 and the second surfaces 413 of the first optical elements 410 via a spray process. The nano-microstructure 422 is formed by the carbon black layer 421 treated via a special treatment. Hence, a composition of the nano-microstructure 422 is the same as a composition of the carbon black layer 421. In particular, the special treatment can be a surface roughening process of the carbon black layer 421, and then the nuclear reaction is performed on a surface of the carbon black layer 421 with a proper material, such as the physical vapor deposition, the chemical vapor deposition, the vacuum evaporation, the sputtering, the ion plating, and so on. That is, the surface roughening process can be regarded as the crystallization process. A surface structure with a nano-crystallization is formed via the crystallization process, and the surface structure of the nano-crystallization is the nano-microstructure 422. After forming the nano-microstructure 422, the coating layer 423 is disposed on an external of the nano-microstructure 422 to protect a nanostructure thereof. Therefore, it is favorable for strengthening the durability and the structural stability of the low-reflection layer 420. The carbon black layer 421 is directly contacted with and connected to the nano-microstructure 422, and the nano-microstructure 422 is directly contacted with and connected to the coating layer 423. Also, the gap does not exist between the carbon black layer 421 and the nano-microstructure 422 and between the nano-microstructure 422 and the coating layer 423.

In detail, a reflection intensity of the stray light is weakened by the extremely low reflectivity of the low-reflection layer 420 to further enhance the image quality. Further, different from techniques of prior art such as the inking process, the blasting process and the coating process, the insufficiency of the structural support of the low-reflection layer 420 is improved by the low-reflection layer 420. The coating layer 423 can be a single-layer film. Although the better anti-reflection effect can be obtained via a multi-layer film of prior art, a process of prior art is more complicated and high-cost, and the aforementioned problem can be improved by the present disclosure. By a choice of a material of the coating layer 423, surface characteristics of the low-reflection layer 420 can be further changed, for example, the anti-oxidation ability can be enhanced; the light intensity of the light reflecting from a surface can be decreased, and so on.

The coating layer 423 can be made of a silicon oxide. When the coating layer 423 is made of the silicon oxide, it is favorable for enhancing the anti-oxidation ability of the low-reflection layer 420. According to the 4th example, a refractive index of the coating layer 423 is 1.46. Therefore, it is favorable for preventing the oxidation of the nano-microstructure 422 and the oxidation of the carbon black layer 421 to promote the durability of the low-reflection layer 420.

In detail, a grain pitch of the nano-microstructure 422 is GP, and the grain pitch GP of the nano-microstructure 422 is a minimum distance between peaks of each of grains. According to the 4th example, the grain pitch GP of the nano-microstructure 422 is 63 nm.

5TH EXAMPLE

Figure 5A:
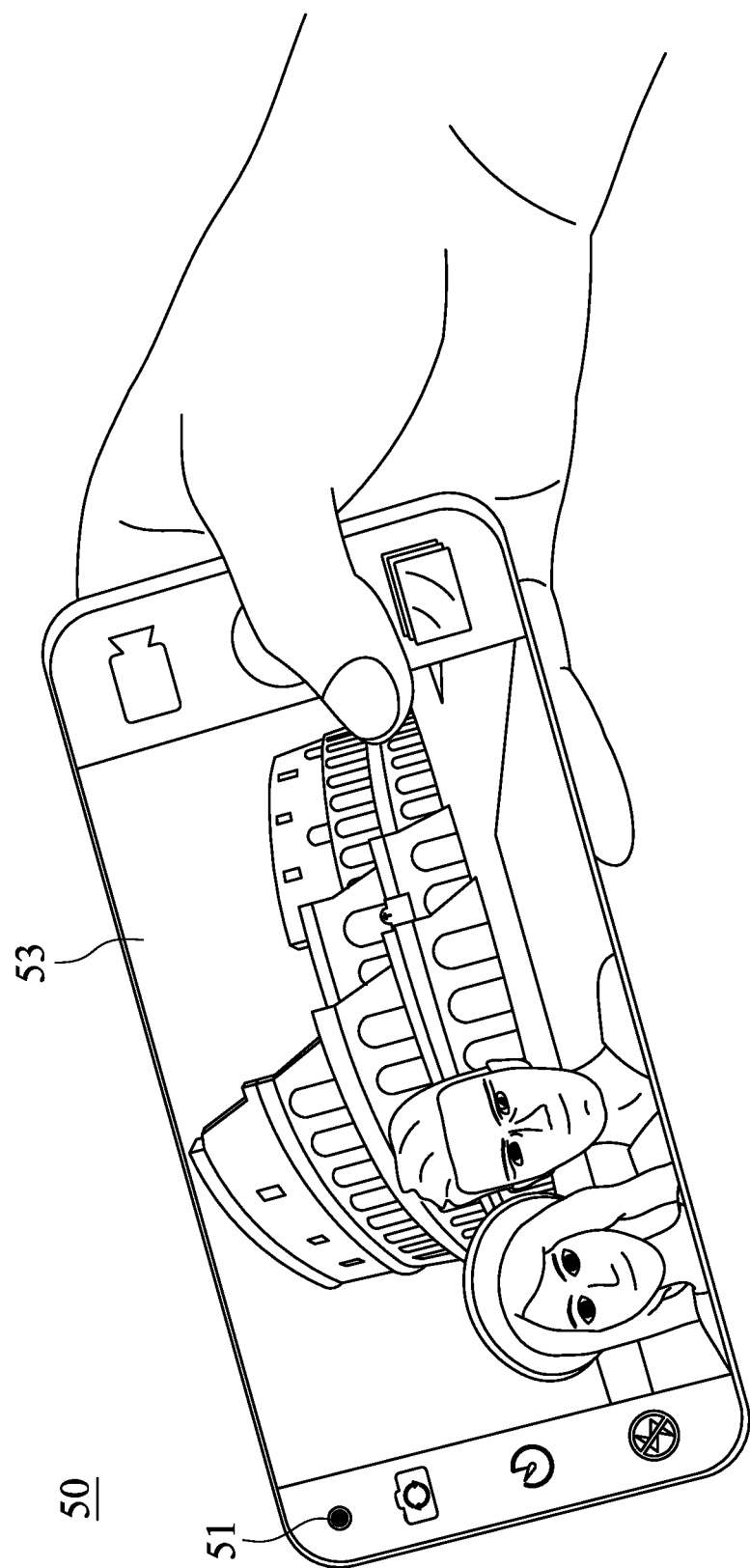
FIG. 5A is a schematic view of an electronic device according to the 5th example of the present disclosure.
Figure 5B:
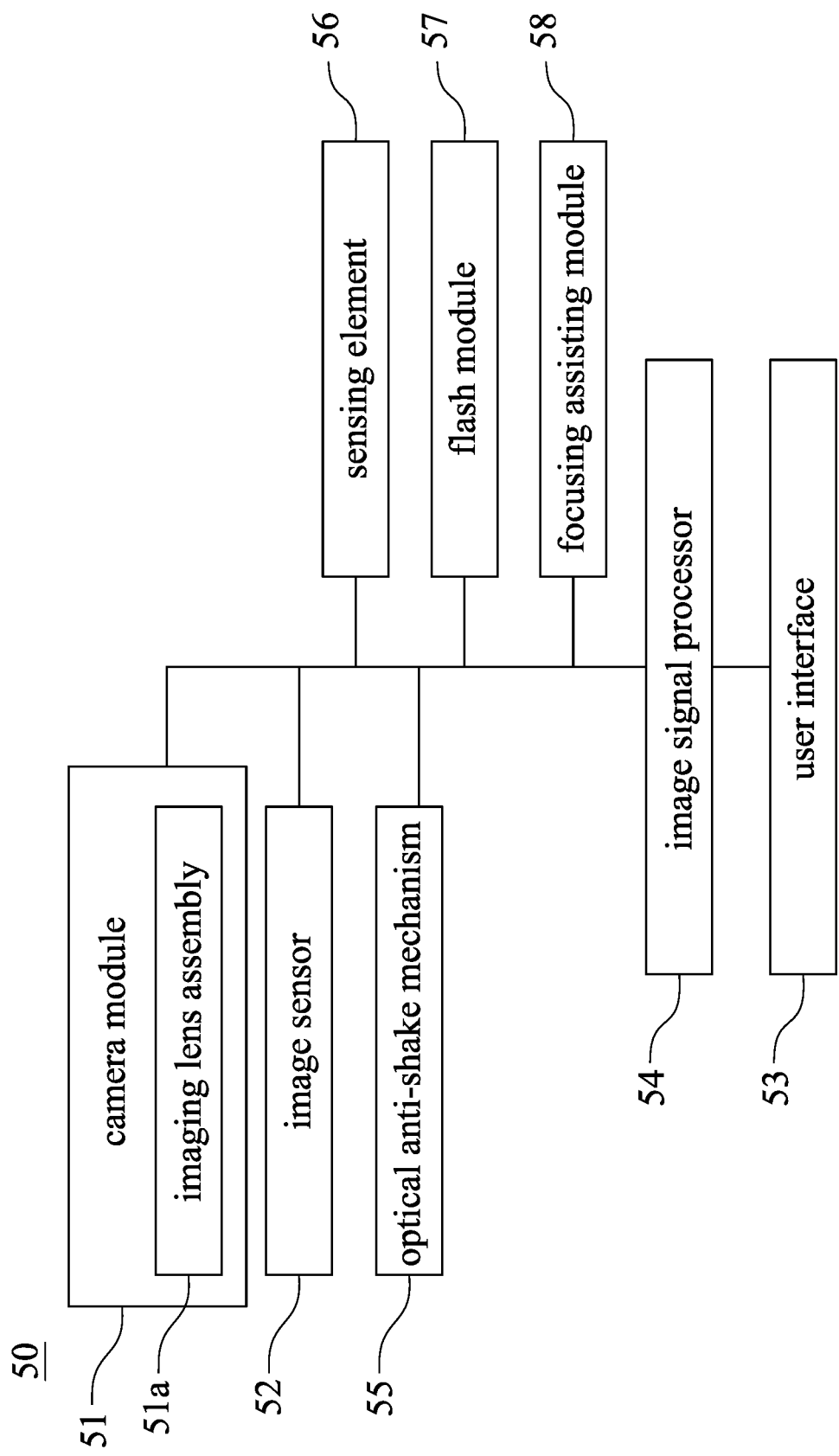
FIG. 5B is a block diagram of the electronic device according to the 5th example in FIG. 5A.

FIG. 5A is a schematic view of an electronic device 50 according to the 5th example of the present disclosure. FIG. 5B is a block diagram of the electronic device 50 according to the 5th example in FIG. 5A. In FIGS. 5A and 5B, the electronic device 50 is a smart phone, and includes a camera module 51, an image sensor 52 and a user interface 53, wherein the image sensor 52 is disposed on an image sensor (not shown). The camera module 51 includes an imaging lens assembly 51a. According to the 5th example, the camera module 51 is disposed on an area of side of the user interface 53, wherein the user interface 53 can be a touch screen or a display screen, but is not limited thereto.

The imaging lens assembly 51a can be one of the imaging lens assemblies according to the aforementioned 1st example to the 4th example, and the imaging lens assembly 51a includes a first optical element (not shown) and a low-reflection layer (not shown), but is not limited thereto.

Moreover, users enter a shooting mode via the user interface 53 of the electronic device 50. At this moment, the imaging light is gathered on the image sensor 52 via the imaging lens assembly 51a, and an electronic signal about an image is output to an image signal processor (ISP) 54.

To meet a specification of a camera of the electronic device 50, the electronic device 50 can further include an optical anti-shake mechanism 55, which can be an optical image stabilization (OIS). Furthermore, the electronic device 50 can further include at least one auxiliary optical element (its reference numeral is omitted) and at least one sensing element 56. According to the 5th example, the auxiliary optical element is a flash module 57 and a focusing assisting module 58. The flash module 57 can be for compensating a color temperature, and the focusing assisting module 58 can be an infrared distance measurement component, a laser focus module, etc. The sensing element 56 can have functions for sensing physical momentum and kinetic energy, such as an accelerator, a gyroscope, a Hall Effect Element, to sense shaking or jitters applied by hands of the user or external environments. Accordingly, the imaging lens assembly 51a of the electronic device 50 equipped with an auto-focusing mechanism and the optical anti-shake mechanism 55 can be enhanced to achieve the superior image quality. Furthermore, the electronic device 50 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 50 can further include, but not be limited to, a display, a control unit, a storage unit, a random access memory (RAM), a read-only memory (ROM), or the combination thereof.

Figure 5C:
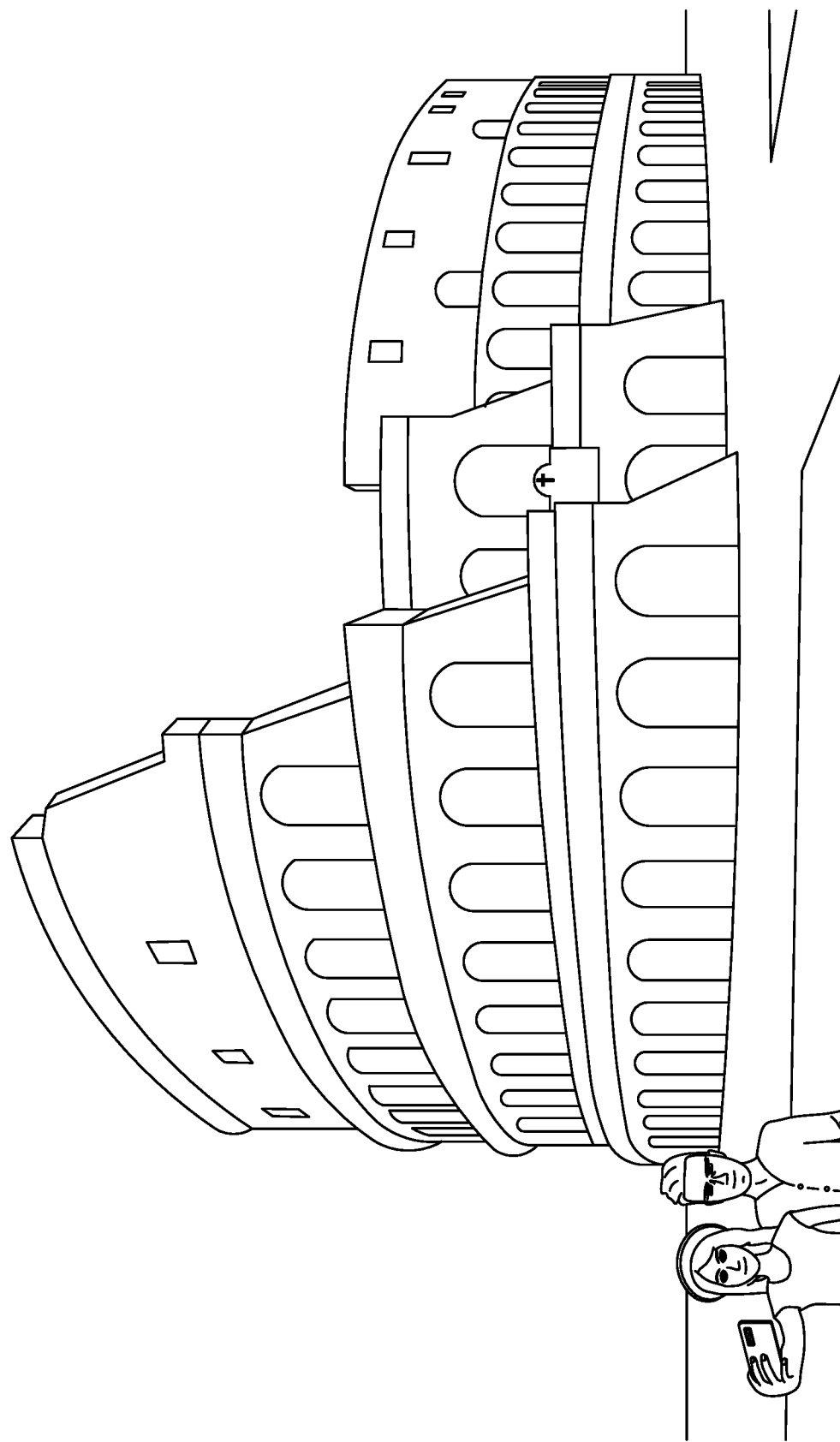
FIG. 5C is a schematic view of selfie scene according to the 5th example in FIG. 5A.
Figure 5D:
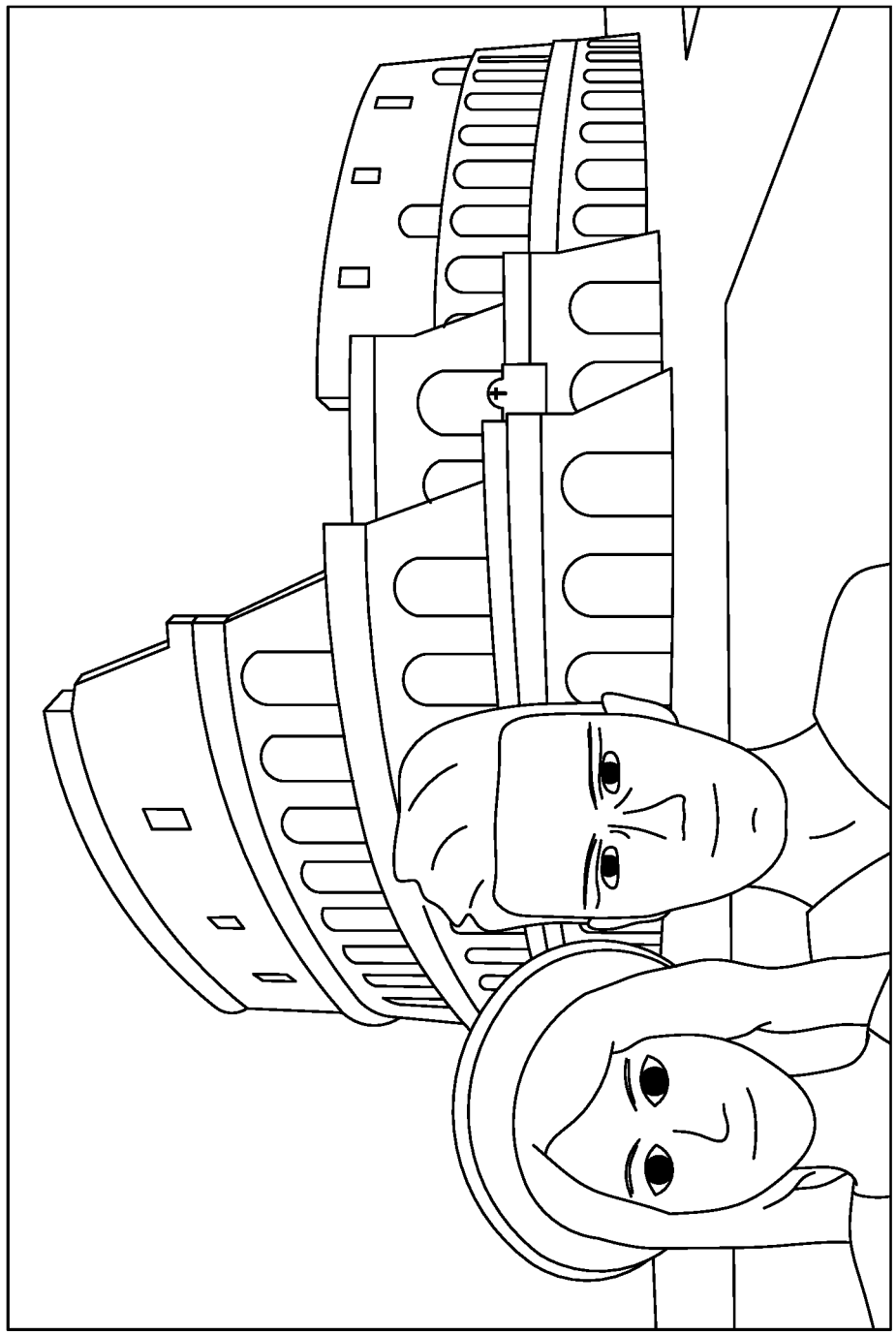
FIG. 5D is a schematic view of a captured image according to the 5th example in FIG. 5A.

FIG. 5C is a schematic view of selfie scene according to the 5th example in FIG. 5A. FIG. 5D is a schematic view of a captured image according to the 5th example in FIG. 5A. In FIGS. 5A to 5D, the imaging lens assembly 51a and the user interface 53 face towards the users. When proceeding selfie or live streaming, the users can watch a captured image and operate an interface at the same time, and the capture image as FIG. 5D can be obtained after shooting. Therefore, better shooting experience can be provided via the imaging lens assembly 51a of the present disclosure.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
a light blocking element, which has an opening, comprising:
a first surface facing towards one side of an object side and an image side of the imaging lens assembly and surrounding the opening; and
a second surface facing towards the other side of the object side and the image side of the imaging lens assembly and surrounding the opening;
a low-reflection layer located on at least one of the first surface and the second surface, and comprising:
a carbon black layer, an appearance thereof being black, and directly contacted with and connected to the at least one of the first surface and the second surface;
a nano-microstructure, being a porous structure form, directly contacted with and connected to the carbon black layer, and the nano-microstructure farther from the light blocking element than the carbon black layer from the light blocking element; and
a coating layer directly contacted with and connected to the nano-microstructure, and the coating layer farther from the light blocking element than the nano-microstructure from the light blocking element;
wherein the low-reflection layer is disposed close to and around the opening;
wherein a reflectivity of the low-reflection layer at a wavelength of 400 nm is R40, a reflectivity of the low-reflection layer at a wavelength of 800 nm is R80, and the following conditions are satisfied:

R40≤0.40%; and

R80≤0.40%.

2. The imaging lens assembly of claim 1, wherein a reflectivity of the low-reflection layer at a wavelength of 380 nm is R38, and the following condition is satisfied:

R38≤0.40%.

3. The imaging lens assembly of claim 2, wherein the reflectivity of the low-reflection layer at the wavelength of 380 nm is R38, and the following condition is satisfied:

R38≤0.30%.

4. The imaging lens assembly of claim 3, wherein the reflectivity of the low-reflection layer at the wavelength of 380 nm is R38, and the following condition is satisfied:

R38≤0.20%.

5. The imaging lens assembly of claim 1, wherein a grain pitch of the nano-microstructure is GP, and the following condition is satisfied:

$$5 \text{ nm} \leq GP \leq 200 \text{ nm}.$$

6. The imaging lens assembly of claim 5, wherein the grain pitch of the nano-microstructure is GP, and the following condition is satisfied:

$$22 \text{ nm} \leq GP \leq 200 \text{ nm}.$$

7. The imaging lens assembly of claim 5, wherein the grain pitch of the nano-microstructure is GP, and the following condition is satisfied:

$$10 \text{ nm} \leq GP \leq 130 \text{ nm}.$$

8. The imaging lens assembly of claim 7, wherein the grain pitch of the nano-microstructure is GP, and the following condition is satisfied:

$$22 \text{ nm} \leq GP \leq 95 \text{ nm}.$$

9. The imaging lens assembly of claim 1, wherein a reflectivity of the low-reflection layer at a wavelength of 680 nm is R68, and the following condition is satisfied:

$$R68 \leq 0.40\%.$$

10. The imaging lens assembly of claim 9, wherein the reflectivity of the low-reflection layer at the wavelength of 680 nm is R68, and the following condition is satisfied:

$$R68 \leq 0.30\%.$$

11. The imaging lens assembly of claim 10, wherein the reflectivity of the low-reflection layer at the wavelength of 680 nm is R68, and the following condition is satisfied:

$$R68 \leq 0.20\%.$$

12. The imaging lens assembly of claim 1, wherein a reflectivity of the low-reflection layer at a wavelength of 1000 nm is R100, and the following condition is satisfied:

$$R100 \leq 0.40\%.$$

13. The imaging lens assembly of claim 12, wherein the reflectivity of the low-reflection layer at the wavelength of 400 nm is R40, the reflectivity of the low-reflection layer at the wavelength of 800 nm is R80, the reflectivity of the low-reflection layer at the wavelength of 1000 nm is R100, and the following conditions are satisfied:

$$R40 \leq 0.30\%;$$

$$R80 \leq 0.30\%; \text{ and}$$

$$R100 \leq 0.30\%.$$

14. The imaging lens assembly of claim 13, wherein the reflectivity of the low-reflection layer at the wavelength of 400 nm is R40, the reflectivity of the low-reflection layer at the wavelength of 800 nm is R80, the reflectivity of the low-reflection layer at the wavelength of 1000 nm is R100, and the following conditions are satisfied:

$$R40 \leq 0.20\%;$$

$$R80 \leq 0.20\%; \text{ and}$$

$$R100 \leq 0.20\%.$$

15. The imaging lens assembly of claim 1, wherein the coating layer is made of a silicon oxide.

16. The imaging lens assembly of claim 1, wherein the coating layer is made of a metal oxide.

17. The imaging lens assembly of claim 1, wherein the coating layer is made of a titanic oxide.

18. A camera module, comprising:
the imaging lens assembly of claim 1.

19. An electronic device, comprising:
the camera module of claim 18; and
an image sensor disposed on an image surface of the camera module.

20. An imaging lens assembly, comprising:
a light blocking element, which can define an opening, comprising:
a first light blocking portion; and
a second light blocking portion, wherein the second light blocking portion and the first light blocking portion are assembled to each other to define the opening; and
a low-reflection layer located on at least one of the first light blocking portion and the second light blocking portion, and comprising:
a carbon black layer, an appearance thereof being black, and directly contacted with and connected to the at least one of the first light blocking portion and the second light blocking portion;
a nano-microstructure, being a porous structure form, directly contacted with and connected to the carbon black layer, and the nano-microstructure farther from the first light blocking portion or the second light blocking portion than the carbon black layer from the first light blocking portion or the second light blocking portion; and
a coating layer directly contacted with and connected to the nano-microstructure, and the coating layer farther from the first light blocking portion or the second light blocking portion than the nano-microstructure from the first light blocking portion or the second light blocking portion;
wherein the low-reflection layer is disposed close to and around the opening;
wherein a reflectivity of the low-reflection layer at a wavelength of 400 nm is R40, a reflectivity of the low-reflection layer at a wavelength of 800 nm is R80, and the following conditions are satisfied:

$$R40 \leq 0.40\%; \text{ and}$$

$$R80 \leq 0.40\%.$$

21. The imaging lens assembly of claim 20, wherein the first light blocking portion comprises:
a first surface, being a surface of the first light blocking portion, and the first surface facing towards one side of an object side and an image side of the imaging lens assembly; and
a second surface, being the surface of the first light blocking portion, and the second surface facing towards the other side of the object side and the image side of the imaging lens assembly.

22. The imaging lens assembly of claim 21, wherein the low-reflection layer is located on at least one of the first surface and the second surface of the first light blocking portion.

23. The imaging lens assembly of claim 20, wherein the second light blocking portion comprises:
a third surface, being a surface of the second light blocking portion, and the third surface facing towards one side of an object side and an image side of the imaging lens assembly; and
a fourth surface, being the surface of the second light blocking portion, and the fourth surface facing towards the other side of the object side and the image side of the imaging lens assembly.

24. The imaging lens assembly of claim 23, wherein the low-reflection layer is located on at least one of the third surface and the fourth surface of the second light blocking portion.

25. The imaging lens assembly of claim 20, wherein a reflectivity of the low-reflection layer at a wavelength of 380 nm is R38, and the following condition is satisfied:

$$R38 \leq 0.40\%.$$

26. The imaging lens assembly of claim 25, wherein the reflectivity of the low-reflection layer at the wavelength of 380 nm is R38, and the following condition is satisfied:

$$R38 \leq 0.30\%.$$

27. The imaging lens assembly of claim 26, wherein the reflectivity of the low-reflection layer at the wavelength of 380 nm is R38, and the following condition is satisfied:

$$R38 \leq 0.20\%.$$

28. The imaging lens assembly of claim 20, wherein a grain pitch of the nano-microstructure is GP, and the following condition is satisfied:

$$5 \text{ nm} \leq GP \leq 200 \text{ nm}.$$

29. The imaging lens assembly of claim 28, wherein the grain pitch of the nano-microstructure is GP, and the following condition is satisfied:

$$22 \text{ nm} \leq GP \leq 200 \text{ nm}.$$

30. The imaging lens assembly of claim 28, wherein the grain pitch of the nano-microstructure is GP, and the following condition is satisfied:

$$10 \text{ nm} \leq GP \leq 130 \text{ nm}.$$

31. The imaging lens assembly of claim 30, wherein the grain pitch of the nano-microstructure is GP, and the following condition is satisfied:

$$22 \text{ nm} \leq GP \leq 95 \text{ nm}.$$

32. The imaging lens assembly of claim 20, wherein a reflectivity of the low-reflection layer at a wavelength of 680 nm is R68, and the following condition is satisfied:

$$R68 \leq 0.40\%.$$

33. The imaging lens assembly of claim 32, wherein the reflectivity of the low-reflection layer at the wavelength of 680 nm is R68, and the following condition is satisfied:

$$R68 \leq 0.30\%.$$

34. The imaging lens assembly of claim 33, wherein the reflectivity of the low-reflection layer at the wavelength of 680 nm is R68, and the following condition is satisfied:

$$R68 \leq 0.20\%.$$

35. The imaging lens assembly of claim 20, wherein the reflectivity of the low-reflection layer at the wavelength of 400 nm is R40, the reflectivity of the low-reflection layer at the wavelength of 800 nm is R80, and the following conditions are satisfied:

$$R40 \leq 0.30\%; \text{ and}$$

$$R80 \leq 0.30\%.$$

36. The imaging lens assembly of claim 35, wherein the reflectivity of the low-reflection layer at the wavelength of 400 nm is R40, the reflectivity of the low-reflection layer at the wavelength of 800 nm is R80, and the following conditions are satisfied:

$$R40 \leq 0.20\%; \text{ and}$$

$$R80 \leq 0.20\%.$$

37. The imaging lens assembly of claim 20, wherein the coating layer is made of a silicon oxide.

38. The imaging lens assembly of claim 20, wherein the coating layer is made of a metal oxide.

39. The imaging lens assembly of claim 20, wherein the coating layer is made of a titanic oxide.

* * * * *